United States Patent
Bermudez Martinez

(10) Patent No.: US 11,828,173 B2
(45) Date of Patent: *Nov. 28, 2023

(54) SYSTEMS AND METHODS FOR REAL-TIME WELL SURVEILLANCE

(71) Applicant: Petrolink International Ltd., Douglas (IM)

(72) Inventor: Rafael Angel Bermudez Martinez, Houston, TX (US)

(73) Assignee: Petrolink International Ltd., Douglas (IM)

( * ) Notice: Subject to any disclaimer, the term of this patent is extended or adjusted under 35 U.S.C. 154(b) by 0 days.

This patent is subject to a terminal disclaimer.

(21) Appl. No.: 17/952,762

(22) Filed: Sep. 26, 2022

(65) Prior Publication Data
US 2023/0087793 A1 Mar. 23, 2023

Related U.S. Application Data

(63) Continuation of application No. 16/544,335, filed on Aug. 19, 2019, now Pat. No. 11,486,247, which is a continuation of application No. 15/588,918, filed on May 8, 2017, now Pat. No. 10,428,647, which is a
(Continued)

(51) Int. Cl.
| | |
|---|---|
| *E21B 47/26* | (2012.01) |
| *E21B 21/08* | (2006.01) |
| *E21B 49/00* | (2006.01) |
| *G01V 11/00* | (2006.01) |

(Continued)

(52) U.S. Cl.
CPC .............. *E21B 47/26* (2020.05); *E21B 21/08* (2013.01); *E21B 49/00* (2013.01); *G01V 11/002* (2013.01); *E21B 44/00* (2013.01); *E21B 44/02* (2013.01)

(58) Field of Classification Search
CPC .......... E21B 49/00; E21B 21/01; E21B 21/08; G01B 11/002
See application file for complete search history.

(56) References Cited

U.S. PATENT DOCUMENTS

| | | | |
|---|---|---|---|
| 4,205,371 A | 5/1980 | Feather | |
| 4,794,535 A * | 12/1988 | Gray | ........................ G07C 3/00 702/9 |
| 5,128,866 A | 7/1992 | Weakley | |

(Continued)

OTHER PUBLICATIONS

DrillingFormulas.com, Effective Viscosity Calculation, Apr. 30, 2012—12:16 pm, https://www.drillingformulas.com/effective-viscosity-calculation/ (Year: 2012).*

(Continued)

*Primary Examiner* — Michael J Dalbo
(74) *Attorney, Agent, or Firm* — Bradley Arant Boult Cummings LLP

(57) ABSTRACT

In an embodiment, a method is performed by a computer system. The method includes integrating a series of data inputs related to a well. The series of data inputs includes at least one real-time data input and at least one non-real-time data input. The method further includes based, at least in part, on a result of the integrating, facilitating a real-time display of performance data for the well. The real-time display includes information related to at least one of hydraulic surveillance and torque-and-drag surveillance.

17 Claims, 31 Drawing Sheets

Related U.S. Application Data continuation of application No. 14/477,444, filed on Sep. 4, 2014, now Pat. No. 10,590,761.

(60) Provisional application No. 61/873,713, filed on Sep. 4, 2013, provisional application No. 61/873,741, filed on Sep. 4, 2013.

(51) Int. Cl.
*E21B 44/02* (2006.01)
*E21B 44/00* (2006.01)

(56) References Cited

U.S. PATENT DOCUMENTS

| | | | |
|---|---|---|---|
| 6,109,368 A | 8/2000 | Goldman et al. | |
| 6,411,902 B1 | 6/2002 | Wiltshire | |
| 6,749,029 B2 | 6/2004 | Alft et al. | |
| 6,826,486 B1 | 11/2004 | Malinverno | |
| 6,950,786 B1 | 9/2005 | Sonneland et al. | |
| 7,054,750 B2 | 5/2006 | Rodney et al. | |
| 7,066,284 B2 | 6/2006 | Wylie et al. | |
| 7,142,986 B2 | 11/2006 | Moran | |
| 7,225,879 B2 | 6/2007 | Wylie et al. | |
| 7,341,117 B2 | 3/2008 | Wylie et al. | |
| 7,542,979 B2 | 6/2009 | Gupta et al. | |
| 7,571,777 B2 | 8/2009 | Wylie et al. | |
| 7,606,666 B2 | 10/2009 | Repin et al. | |
| 7,836,973 B2 | 11/2010 | Belcher et al. | |
| 7,980,312 B1 | 7/2011 | Hill et al. | |
| 8,011,446 B2 | 9/2011 | Wylie et al. | |
| 8,122,975 B2 | 2/2012 | Belcher et al. | |
| 8,316,936 B2 | 11/2012 | Roddy et al. | |
| 8,615,374 B1 | 12/2013 | Discenzo | |
| 9,191,266 B2 | 11/2015 | Abraham et al. | |
| 9,512,707 B1 | 12/2016 | Bermudez Martinez | |
| 9,518,459 B1 | 12/2016 | Bermudez Martinez et al. | |
| 10,209,400 B2 | 2/2019 | Bermudez Martinez et al. | |
| 10,329,892 B2 | 6/2019 | Bermudez Martinez | |
| 10,590,761 B1 | 3/2020 | Bermudez Martinez | |
| 2002/0073082 A1 | 6/2002 | Duvillier et al. | |
| 2003/0074139 A1 | 4/2003 | Poedjono | |
| 2004/0019696 A1 | 1/2004 | Scott et al. | |
| 2004/0149431 A1 | 8/2004 | Wylie et al. | |
| 2005/0063251 A1 | 3/2005 | Guidry et al. | |
| 2005/0197777 A1 | 9/2005 | Rodney et al. | |
| 2005/0209866 A1 | 9/2005 | Veeningen et al. | |
| 2005/0241855 A1 | 11/2005 | Wylie et al. | |
| 2005/0267899 A1 | 12/2005 | Gupta et al. | |
| 2006/0173625 A1 | 8/2006 | Moran | |
| 2007/0047279 A1 | 3/2007 | Evans et al. | |
| 2007/0061081 A1 | 3/2007 | Moran | |
| 2007/0089508 A1 | 4/2007 | Allmendinger | |
| 2007/0185696 A1 | 8/2007 | Moran et al. | |
| 2007/0187146 A1 | 8/2007 | Wylie et al. | |
| 2007/0252717 A1 | 11/2007 | Fielder | |
| 2007/0284147 A1 | 12/2007 | Moran | |
| 2008/0060846 A1 | 3/2008 | Belcher et al. | |
| 2008/0071817 A1 | 3/2008 | Gaurav et al. | |
| 2008/0087423 A1 | 4/2008 | Wylie et al. | |
| 2008/0156977 A1* | 7/2008 | Jeffryes | E21B 47/11 |
| | | | 73/152.21 |
| 2008/0179094 A1 | 7/2008 | Repin et al. | |
| 2008/0181230 A1 | 7/2008 | Hitt et al. | |
| 2008/0184269 A1 | 7/2008 | Avery et al. | |
| 2008/0208475 A1 | 8/2008 | Karr et al. | |
| 2008/0262810 A1 | 10/2008 | Moran et al. | |
| 2008/0294606 A1 | 11/2008 | Moran et al. | |
| 2009/0077008 A1 | 3/2009 | Francis | |
| 2009/0090555 A1 | 4/2009 | Boone et al. | |
| 2009/0132458 A1 | 5/2009 | Edwards et al. | |
| 2009/0152005 A1 | 6/2009 | Chapman et al. | |
| 2009/0159336 A1 | 6/2009 | Boone | |
| 2009/0182472 A1 | 7/2009 | Singh et al. | |
| 2009/0234584 A1 | 9/2009 | Casey et al. | |
| 2009/0254569 A1 | 10/2009 | Paulk et al. | |
| 2009/0294174 A1* | 12/2009 | Harmer | E21B 47/12 |
| | | | 175/48 |
| 2009/0308601 A1* | 12/2009 | Poe, Jr. | E21B 47/10 |
| | | | 166/250.01 |
| 2009/0308616 A1 | 12/2009 | Wylie et al. | |
| 2010/0005111 A1 | 1/2010 | Bal et al. | |
| 2010/0179963 A1 | 7/2010 | Conner et al. | |
| 2010/0191511 A1 | 7/2010 | Hsu et al. | |
| 2010/0204972 A1 | 8/2010 | Hsu et al. | |
| 2010/0217530 A1 | 8/2010 | Boone | |
| 2010/0259415 A1 | 10/2010 | Strachan et al. | |
| 2011/0106856 A2 | 5/2011 | Paulk et al. | |
| 2011/0114387 A1 | 5/2011 | Belcher et al. | |
| 2011/0132662 A1 | 6/2011 | Dennis | |
| 2011/0166843 A1 | 7/2011 | Hsu et al. | |
| 2011/0170373 A1 | 7/2011 | Hsu et al. | |
| 2011/0174541 A1 | 7/2011 | Strachan et al. | |
| 2011/0175899 A1 | 7/2011 | Bittar et al. | |
| 2011/0253445 A1* | 10/2011 | Hannegan | E21B 19/006 |
| | | | 175/5 |
| 2012/0072578 A1 | 3/2012 | Alam | |
| 2012/0197898 A1 | 8/2012 | Pandey et al. | |
| 2013/0013677 A1 | 1/2013 | Engstrom et al. | |
| 2013/0135115 A1 | 5/2013 | Johnson et al. | |
| 2013/0144531 A1* | 6/2013 | Johnston | E21B 44/00 |
| | | | 702/9 |
| 2013/0254416 A1 | 9/2013 | Abraham et al. | |
| 2015/0347565 A1 | 12/2015 | Abraham et al. | |
| 2016/0281490 A1 | 9/2016 | Samuel | |
| 2016/0281498 A1 | 9/2016 | Nguyen et al. | |
| 2017/0051601 A1 | 2/2017 | Bermudez Martinez | |
| 2017/0052282 A1 | 2/2017 | Bermudez Martinez et al. | |
| 2019/0146118 A1 | 5/2019 | Bermudez Martinez et al. | |
| 2019/0213205 A1 | 7/2019 | Abraham et al. | |
| 2019/0376385 A1 | 12/2019 | Bermudez Martinez | |

OTHER PUBLICATIONS

Fontenot, John E., and R.K. Clark. "An Improved Method for Calculating Swab and Surge Pressures and Circulating Pressures in a Drilling Well." SPE J. 14 (1974): 451-462. doi: https://doi.org/10.2118/4521-PA (Year: 1974).*

Whittaker, A. (1985). Swab and Surge. In: Whittaker, A. (eds) Theory and Applications of Drilling Fluid Hydraulics. The Exlog Series of Petroleum Geology and Engineering Handbooks, vol. 1. Springer, Dordrecht. https://doi.org/10.1007/978-94-009-5303-1_8 (Year: 1985).*

U.S. Appl. No. 14/477,444, Bermudez Martinez.

U.S. Appl. No. 15/446,761, Gonzalez.

Halliburton / Landmark Software & Services, "Drillworks® User Guide", Oct. 2009.

Martínez, R.B., Petrolink Services, Inc., and Olán, C.I., Petrolink Services, Inc., "Improving Real-Time Drilling Optimization Applying Engineering Performance From Offset Wells." SPWLA 53rd Annual Logging Symposium, Jun. 16-20, 2012.

Khudiri, M.M. and Shehry, M.A., Saudi Aramco, and Curtis, J.D., Petrolink International, "Data Architecture of Real-Time Drilling and Completions Information at Saudi Aramco;" SPE 116848, 2008 SPE Russian Oil & Gas Technical Conference and Exhibition, Moscow, Russia, Oct. 28-30, 2008.

Pérez-Téllez, C., Rodríguez, R., and Ramírez, I., Pemex Drilling Business Unit, and Bermúdez- Martínez, R.A., and Palavicini-Cham, C.A., Petrolink Services Inc., "Applying a Real-Time Engineering Methodology to Drill Ahead of Potential Undesirable Events;" OTC 23180, Offshore Technology Conference, Houston, Texas, USA, Apr. 30-May 3, 2012.

González, Édgar, "U.S. Appl. No. 15/446,761" filed Mar. 1, 2017.

McLaren, et al., "Improving the Value of Real-Time Drilling Data to Aid Collaboration, Drilling Optimization, and Decision Making," Nov. 11-14, 2007, 2007 SPE Annual Technical Conference and Exhibition, Anaheim, CA, pp. 1-13.

One_Petro_Search_Results, Mar. 9, 2021, 6 pp. (Year: 2021).

Yoshida, Chikao, et al.; "An Investigative Study of Recent Technologies Used for Prediction, Detection, and Evaluation of Abnor-

(56) References Cited

OTHER PUBLICATIONS mal Formation Pressure and Fracture Pressure in North and South America"; IADC/SPE Asia Pacific Drilling Technology Conference; Kuala Lumpur, Malaysia; Sep. 1996; pp. 131-151.
One Petro Search Results; dated Jun. 14, 2021; 10 pages.
Li, Y., Bjorndalen, N., and E. Kuru. "Numerical Modelling of Cuttings Transport in Horizontal Wells Using Conventional Drilling Fluids," J Can Pet Technol 46 (2007): No Pagination Specified. doi: https://doi.org/10.2118/07-07-TN (Year: 2007).
DrillingFormulas.com, Critical Flow Rate—Drilling Hydraulics, May 15, 2012—6:30 am, https://www.drillingformulas.com/critical-flow-rate-drilling-hydraulics/ (Year: 2012).
DrillingFormulas.com, Power Law Constants (n and K) Calculation, Apr. 16, 2012—12:10 pm, https://www.drillingformulas.com/power-law-constants-n-and-k-calculation/ (Year: 2012).
DrillingFormulas.com, Effective Viscosity Calculation, Apr. 30, 2012—16:16 pm, https://www.drillingformulas.com/effective-viscosity-calculation/ (Year: 2012).

\* cited by examiner

| DRILL PIPE INFORMATION | | | | |
|---|---|---|---|---|
| | Diameters | | Depth | |
| Section # | ID | OD | From | To |
| 1 | | | | |
| 2 | | | | |
| 3 | | | | |
| ... | | | | |
| x | | | | |

| DRILL COLLAR INFORMATION | | | | |
|---|---|---|---|---|
| | Diameters | | Depth | |
| Section # | ID | OD | From | To |
| 1 | | | | |
| 2 | | | | |
| 3 | | | | |
| ... | | | | |
| x | | | | |

| CASING INFORMATION | | | |
|---|---|---|---|
| | | Depth | |
| Section # | ID | From | To |
| 1 | | | |
| 2 | | | |
| 3 | | | |
| ... | | | |
| x | | | |

| BIT INFORMATION | | | |
|---|---|---|---|
| | | Depth | |
| Section # | OD | From | To |
| 1 | | | |
| 2 | | | |
| 3 | | | |
| ... | | | |
| x | | | |

FIG. 4

| POWER LAW CONSTANT CALCULATIONS ||
|---|---|
| Either link these values to the daily mud report or input manually. ||
| Lecture @ 600 RPM: | |
| Lecture @ 300 RPM: | |
| Lecture @ 3 RPM: | |

FIG. 5

| Section # | MUD WEIGHT INFORMATION | | | |
|---|---|---|---|---|
| | Weight | | Depth | |
| | From | To | From | To |
| 1 | | | | |
| 2 | | | | |
| 3 | | | | |
| ... | | | | |
| x | | | | |

FIG. 6

| JET (NOZZLE) INFORMATION ||
|---|---|
| Jet # | Diameter |
| 1 | |
| 2 | |
| 3 | |
| ... | |
| x | |

FIG. 9

NON-REAL-TIME INPUTS
Input values and update as necessary.

| Average Cutting Diameter: | |

FIG. 12

NON-REAL-TIME INPUTS
Input values and update as necessary.

| Average Cutting Thickness: | |

FIG. 13

| NON-REAL-TIME INPUTS | |
|---|---|
| Input values and update as necessary. | |
| Time from Slips to Slips: | |
| Stand Length: | |

FIG. 16

SYSTEMS AND METHODS FOR REAL-TIME WELL SURVEILLANCE

CROSS-REFERENCE TO RELATED APPLICATIONS

This patent application is a continuation of, and incorporates by reference, the entire disclosure of, U.S. patent application Ser. No. 16/544,335, filed on Aug. 19, 2019. U.S. patent application Ser. No. 16/544,335 is a continuation of, and incorporates by reference the entire disclosure of, U.S. patent application Ser. No. 15/588,918, filed on May 8, 2017, now U.S. Pat. No. 10,428,647, issued on Oct. 1, 2019. U.S. patent application Ser. No. 15/588,918 is a continuation of, and incorporates by reference the entire disclosure of, U.S. patent application Ser. No. 14/477,444, filed on Sep. 4, 2014, now U.S. Pat. No. 10,590,761, issued on Mar. 17, 2020. U.S. patent application Ser. No. 14/477,444 claims priority from, and incorporates by reference the entire disclosure of, U.S. Provisional Patent Application No. 61/873,713, filed on Sep. 4, 2013. U.S. patent application Ser. No. 14/477,444 also claims priority from, and incorporates by reference the entire disclosure of, U.S. Provisional Patent Application No. 61/873,741, filed on Sep. 4, 2013. In addition, this patent application incorporates by reference the entire disclosures of U.S. patent application Ser. Nos. 13/829,590, 13/919,240, and 14/018,298.

BACKGROUND

Technical Field

The present disclosure relates generally to drilling analytics and more particularly, but not by way of limitation, to systems and methods for real-time well surveillance.

History of Related Art

An oil well is a general term for any boring through the earth's surface that is designed to find petroleum-oil hydrocarbons. An initial life of an oil well can be viewed in three stages: planning, drilling, and completion. During these stages, a huge volume of information is generated. This information can be loosely categorized into two types: static data and real-time data. Static data is generated either in advance (e.g., modeling data, cost predictions, and well plans) or after events (e.g., daily reports, mud reports, fracture reports, and casing data). Static data can be delivered either on a regular basis (e.g. daily reports) or on a per-event basis (e.g., fracture reports and completion reports). Real-time data is sensor-derived data that is generated through either analysis of fluids (e.g., mud logs) or through deploying sensor tools in a well hole. Real-time data can be collected immediately via, for example, telemetry, or upon completion of a tool run (e.g., memory data). Real-time data can be, for example, time-indexed or depth-indexed During the drilling and completion stages, there has been increased focus on remote support and participation. In particular, there is significant value to be obtained from an ability to analyze in real time various data streams that are generated. A typical oil well can require collaboration from teams based at the oil well, in regional offices, and corporate headquarters. This may mean that people thousands of miles apart need to be sure they are looking at the same data sets. These data sets, in turn, may be aggregated from several different streams of data, from historical data generated in previous wells, or from models predicted during the planning stage.

Benefits can be gained from cross-correlation and analysis of this data. Historically this has not been possible due to schisms in the organization of data and the difficulty of sharing many different types of data in the time constraints required for real-time analysis across multiple locations. Further complications have been generated by the requirement to tightly control access to this data to ensure security for what can be extremely valuable information that can have significant market impact upon an oil company.

SUMMARY OF THE INVENTION

In an embodiment, a method is performed by a computer system. The method includes integrating a series of data inputs related to a well. The series of data inputs includes at least one real-time data input and at least one non-real-time data input. The method further includes based, at least in part, on a result of the integrating, facilitating a real-time display of performance data for the well. The real-time display includes information related to at least one of hydraulic surveillance and torque-and-drag surveillance.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 4 illustrates interface inputs for velocity;

FIG. 5 illustrates interface inputs for power law constants;

FIG. 6 illustrates interface inputs for Reynolds Number and critical Reynolds Numbers;

FIG. 9 illustrates interface inputs for total flow area;

FIG. 12 illustrates interface inputs for boundary shear rate;

FIG. 13 illustrates interface inputs for shear stress developed by the particle;

FIG. 16 illustrates interface inputs for average maximum speed of pipe movement and equivalent fluid velocity;

DETAILED DESCRIPTION OF ILLUSTRATIVE EMBODIMENTS OF THE INVENTION

Figure 1:
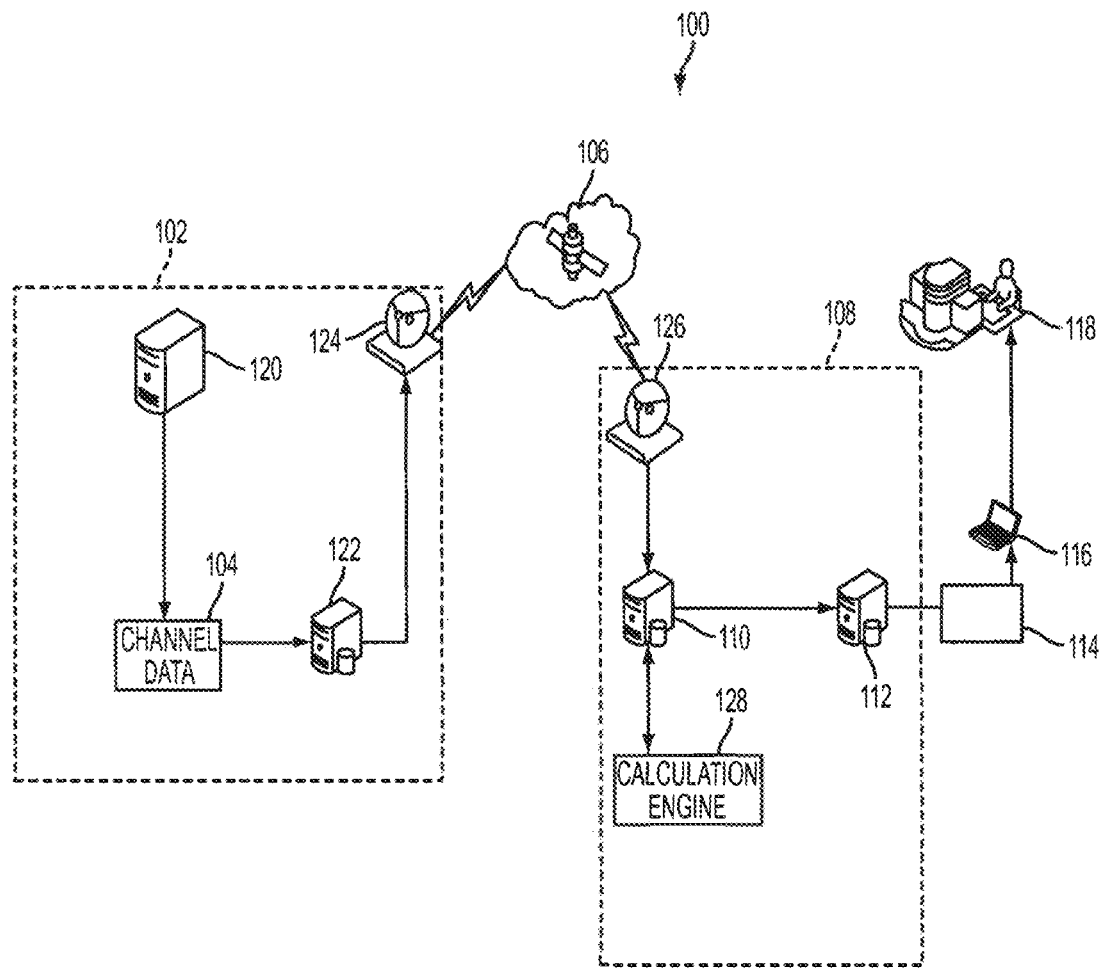
FIG. 1 illustrates an example of a system for facilitating real-time well surveillance.

FIG. 1 illustrates an example of a system 100 for facilitating real-time well surveillance. The system 100 includes a wellsite computer system 102, a central computing system 108, and a communications network 106. The wellsite computer system 102 includes a collection server 120, a remote-integration server 122, and a network link 124. The central computing system 108 includes a main server 110, a repository server 112, and a network link 126. It should be appreciated that the depicted configurations of the central computing system 108 and the wellsite computer system 102 are illustrative in nature. The central computing system 108 and the wellsite computer system can each include any number of physical or virtual server computers and databases. For example, in various embodiments, the remote-integration server 122 may be omitted or have its functionality integrated into the collection server 120. Other modifications and rearrangements will be apparent to one of ordinary skill in the art after reviewing inventive principles contained herein.

In a typical embodiment, the wellsite computer system 102 is located at or near a wellsite for a current well and communicates with the central computing system 108 over the communications network 106. The communications network 106 may include, for example, satellite communication between the network link 124 of the wellsite computer system 102 and the network link 126 of the central computing system 108. Thus, the network link 124 and the network link 126 can be, for example, satellite links. For simplicity of description, communication between the wellsite computer system 102 and the central computing system 108 may be described below without specific reference to the network link 124, the network link 126, and the communications network 106.

Using, for example, logging while drilling (LWD), the collection server 120 receives and/or generates channel data 104 (e.g., in WITS0) via data received from sensors that are in use at the wellsite. A given sensor or other source of data is referred to herein as a "channel." Data from a channel may be referred to as "channel data," which term is inclusive of both raw data and metadata. The raw data includes, for example, measured data determined by the sensor or source. The measured data can include, for example, resistivity, porosity, permeability, density, and gamma-ray data. The metadata includes information about the raw data such as, for example, time, depth, identification information for the channel, and the like. The collection server 120 transmits the channel data 104 to the remote-integration server 122, which communicates the channel data 104 to the central computing system 108 in real-time.

On the central computing system 108, the main server 110 receives the channel data 104 from the wellsite computer system 102 and converts the channel data 104 to a common data format. The conversion of channel data to a common data format is described in detail in U.S. patent application Ser. No. 13/829,590, which application is incorporated by reference above. As shown, the main server 110 has a calculation engine 128 resident thereon. Via the calculation engine 128, the main server 110 generates calculated data in real-time based on the channel data 104. The calculation engine 128 can be, for example, a software application that implements algorithms to generate the calculated data. The calculation engine 128 can also maintain settings that are utilized for generating the calculated data.

The repository server 112 stores and maintains the channel data 104 and any calculated data according to the common data format. Storage and maintenance of data according to the common data format is described in detail in U.S. patent application Ser. No. 13/829,590, which application is incorporated by reference above. In a typical embodiment, the repository server 112 stores channel data from a plurality of wellsite computer systems located at a plurality of wellsites in this fashion.

The repository server 112 facilitates a real-time display 114 of drilling-performance data (e.g., information related to hydraulic surveillance, torque-and-drag surveillance, etc.) related to the wellsite. In a typical embodiment, the real-time display 114 is provided via a network such as, for example, the Internet, via a web interface. In some cases, the real-time display 114 can be shown and updated in real time on a computing device 116 as the channel data 104 is received. In a typical embodiment, the real-time display 114 allows engineering personnel 118 to perform real-time analysis for the wellsite.

Figure 2:
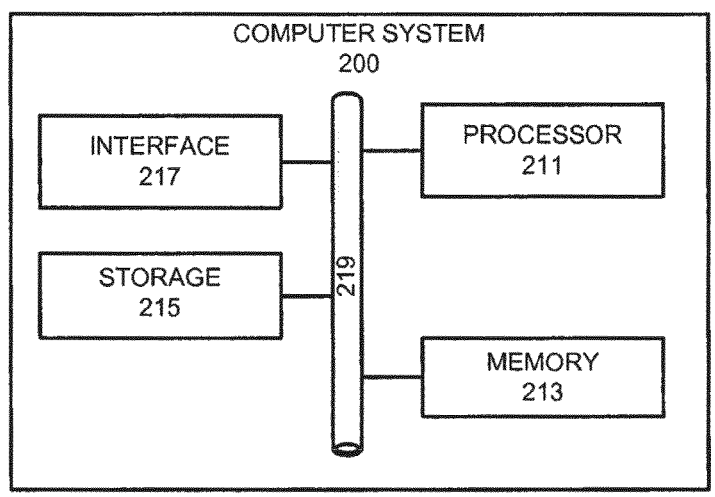
FIG. 2 illustrates an example of a computer system.

FIG. 2 illustrates an example of a computer system 200. In various cases, the computer system 200 can be generally representative, for example, of the wellsite computer system 102 and/or the central computing system 108. In addition, or alternatively, the computer system 200 can be an example of the collection server 120, the remote-integration server 122, the main server 110, the repository server 112, and/or the like.

The computer system 200 may itself include one or more portions of one or more computer systems. In particular embodiments, one or more of these computer systems may perform one or more steps of one or more methods described or illustrated herein and/or incorporated by reference herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of the computer system 200 may comprise any suitable physical form, configuration, number, type and/or layout. As an example, and not by way of limitation, the computer system 200 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system 200 may include one or more computer systems; be unitary or distributed; span multiple locations; span multiple machines; or reside in a cloud, which may include one or more cloud components in one or more networks.

In the depicted embodiment, the computer system 200 includes a processor 211; memory 213; storage 215; interface 217; and bus 219. Although a particular computer system is depicted having a particular number of particular components in a particular arrangement, this disclosure contemplates any suitable computer system 200 having any suitable number of any suitable components in any suitable arrangement.

Processor 211 may be a microprocessor, controller, or any other suitable computing device, resource, or combination of hardware, software and/or encoded logic operable to provide, either alone or in conjunction with other components, (e.g., memory 213) wireless networking functionality. Such functionality may include providing various features discussed herein. For example, processor 211 may facilitate one or more applications that provide real-time surveillance as described herein. In particular embodiments, processor 211 may include hardware for executing instructions, such as those making up a computer program. As an example and not by way of limitation, to execute instructions, processor 211 may retrieve (or fetch) instructions from an internal register, an internal cache, memory 213, or storage 215; decode and execute them; and then write one or more results to an internal register, an internal cache, memory 213, or storage 215.

In particular embodiments, processor 211 may include one or more internal caches for data, instructions, or addresses. This disclosure contemplates processor 211 including any suitable number of any suitable internal caches, where appropriate. As an example and not by way of limitation, processor 211 may include one or more instruction caches, one or more data caches, and one or more translation lookaside buffers (TLBs). Instructions in the instruction caches may be copies of instructions in memory 213 or storage 215 and the instruction caches may speed up retrieval of those instructions by processor 211. Data in the data caches may be copies of data in memory 213 or storage 215 for instructions executing at processor 211 to operate on; the results of previous instructions executed at processor 211 for access by subsequent instructions executing at processor 211, or for writing to memory 213, or storage 215; or other suitable data. The data caches may speed up read or write operations by processor 211. The TLBs may speed up virtual-address translations for processor 211. In particular embodiments, processor 211 may include one or more internal registers for data, instructions, or addresses. Depending on the embodiment, processor 211 may include any suitable number of any suitable internal registers, where appropriate. Where appropriate, processor 211 may include one or more arithmetic logic units (ALUs); be a multi-core processor; include one or more processors 211; or any other suitable processor.

Memory 213 may be any form of volatile or non-volatile memory including, without limitation, magnetic media, optical media, random access memory (RAM), read-only memory (ROM), flash memory, removable media, or any other suitable local or remote memory component or components. In particular embodiments, memory 213 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 213 may include one or more memories 213, where appropriate. Memory 213 may store any suitable data or information utilized by computer system 200, including software embedded in a computer readable medium, and/or encoded logic incorporated in hardware or otherwise stored (e.g., firmware). In particular embodiments, memory 213 may include main memory for storing instructions for processor 211 to execute or data for processor 211 to operate on. In particular embodiments, one or more memory management units (MMUs) may reside between processor 211 and memory 213 and facilitate accesses to memory 213 requested by processor 211.

As an example and not by way of limitation, computer system 200 may load instructions from storage 215 or another source (such as, for example, another computer system) to memory 213. Processor 211 may then load the instructions from memory 213 to an internal register or internal cache. To execute the instructions, processor 211 may retrieve the instructions from the internal register or internal cache and decode them. During or after execution of the instructions, processor 211 may write one or more results (which may be intermediate or final results) to the internal register or internal cache. Processor 211 may then write one or more of those results to memory 213. In particular embodiments, processor 211 may execute only instructions in one or more internal registers or internal caches or in memory 213 (as opposed to storage 215 or elsewhere) and may operate only on data in one or more internal registers or internal caches or in memory 213 (as opposed to storage 215 or elsewhere).

In particular embodiments, storage 215 may include mass storage for data or instructions. As an example and not by way of limitation, storage 215 may include a hard disk drive (HDD), a floppy disk drive, flash memory, an optical disc, a magneto-optical disc, magnetic tape, or a Universal Serial Bus (USB) drive or a combination of two or more of these. Storage 215 may include removable or non-removable (or fixed) media, where appropriate. Storage 215 may be internal or external to computer system 200, where appropriate. In particular embodiments, storage 215 may be non-volatile, solid-state memory. In particular embodiments, storage 215 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 215 may take any suitable physical form and may comprise any suitable number or type of storage. Storage 215 may include one or more storage control units facilitating communication between processor 211 and storage 215, where appropriate.

In particular embodiments, interface 217 may include hardware, encoded software, or both providing one or more interfaces for communication (such as, for example, packet-based communication) among the wellsite computer system 102, the central computing system 108, any networks, any network devices, and/or any other computer systems. As an example and not by way of limitation, communication interface 217 may include a network interface controller (NIC) or network adapter for communicating with an Ethernet or other wire-based network and/or a wireless NIC (WNIC) or wireless adapter for communicating with a wireless network.

In some embodiments, interface 217 comprises one or more radios coupled to one or more physical antenna ports 116. Depending on the embodiment, interface 217 may be any type of interface suitable for any type of network for which computer system 200 is used. As an example and not by way of limitation, computer system 200 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 200 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. Computer system 200 may include any suitable interface 217 for any one or more of these networks, where appropriate.

In some embodiments, interface 217 may include one or more interfaces for one or more I/O devices. One or more of these I/O devices may enable communication between a person and computer system 200. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 217 for them. Where appropriate, interface 217 may include one or more drivers enabling processor 211 to drive one or more of these I/O devices. Interface 217 may include one or more interfaces 217, where appropriate.

Bus 219 may include any combination of hardware, software embedded in a computer readable medium, and/or encoded logic incorporated in hardware or otherwise stored (e.g., firmware) to couple components of computer system 200 to each other. As an example and not by way of limitation, bus 219 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 219 may include any number, type, and/or configuration of buses 219, where appropriate. In particular embodiments, one or more buses 219 (which may each include an address bus and a data bus) may couple processor 211 to memory 213. Bus 219 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 211 (such as, for example, one or more internal registers or caches), one or more portions of memory 213, one or more portions of storage 215, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

For purposes of illustration, examples of performing real-time well surveillance are described in U.S. Provisional Patent Application Nos. 61/873,713 and 61/873,741, which applications are incorporated by reference above. In certain embodiments, the described examples can leverage one or more of the computer systems described above with respect to FIGS. 1-2.

Hydraulic Surveillance in Analysis Real-Time

The hydraulic surveillance analysis in real time takes a series of real-time and non-real-time inputs while combining and integrating several workflows to produce a unique engineering real-time suite full of outputs and graphs. The hydraulic analyses following the drill string design for drill pipes, drill collar, among annular spaces as well, taking in consideration the boundaries to get the hole clean and save time as possible. The hydraulic suite in real-time has addressed more than 98 different hydraulic analyses to get the most complete hydraulic analysis ever made in real-time.

Several companies have individual worksheets or calculators to compute values manually, but these results only represent an instant in time and depth, whereas real-time values are for all instants of time and depth over the duration of the program run. This will benefit companies by giving real-time feedback about drilling performance, allowing immediate action to prevent drilling hazards that would otherwise lead to catastrophic problems, such as, stuck pipe, blowouts, and more.

Advantages are as follows: (1) provide a full analysis in real-time for drill pipe, drill collars, and annular spaces on the well throughout velocities, effectives viscosities, pressure losses, equivalent circulation density, shear stresses, transport velocities, transport efficiencies—hole cleaning, cutting transportations—hole cleaning, loss pressure at the bit, hydraulic power and impact force among swab and surge analyses; (2) help to prevent blowouts because the system can measure the delta of the SPP real versus plan, considering the features of the well in real-time; (3) save millions of US dollars because of the support that the system can provide within the decision making process; (4) improve the health condition of the well because the results are being updated in real-time, including non-real values, such as Lecture 300, Lecture 600, L3, and L6, to analyze the mud properties on the bottom of the well; and (5) represent an economic solution which avoids the use of expensive tools such as pressure while drilling (PWD) to measure the annular pressure on the well.

Each equation setout below will have a definition of what the equations represent, notes, and interface requirements. Table 1 below illustrates unit abbreviations.

TABLE 1

| Unit | Abbreviation |
|---|---|
| inch | in |
| centimeter | cm |
| foot | ft |
| meter | m |
| gallon | gal |
| liter | L |
| pound (mass) | lb |
| pound (force) | lbF |
| kilogram | kg |
| newton | N |
| second | s |
| minute | min |
| hour | hr |
| pounds per square inch | psi |
| pascal | Pa |
| centipoise | cP |
| horse power | hp |
| watt | W |
| percent | % |
| decimal | dec |

Inputs

The following list contains inputs that will process the output for the overall hydraulics real-time analysis. The name of every input is given, along with its respective symbol, its units, and whether the data is collected in real-time (RT), or not in real-time (NRT). Table 2 below illustrates list of inputs.

TABLE 2

| # | Name | Symbol | Units | | | | RT/NRT |
|---|---|---|---|---|---|---|---|
| 1 | Bit Outside Diameter | $d_h$ | in | ft | cm | — | NRT |
| 2 | Casing Inside Diameter | $d_c$ | in | ft | cm | — | NRT |
| 3 | Drill Pipe Inside Diameter | $d_{dpi}$ | in | ft | cm | — | NRT |
| 4 | Drill Pipe Outside Diameter | $d_{dpo}$ | in | ft | cm | — | NRT |
| 5 | Drill Collar Inside Diameter | ddci | in | ft | cm | — | NRT |
| 6 | Drill Collar Outside Diameter | ddco | in | ft | cm | — | NRT |
| 7 | Volumetric Flow Rate | Q | gal/min | ft³/min | L/min | m³/min | RT |
| 8 | Lecture, 600 RPM | $\theta_{600}$ | n/a | — | — | — | NRT |
| 9 | Lecture, 300 RPM | $\theta_{300}$ | n/a | — | — | — | NRT |
| 10 | Lecture, 3 RPM | $\theta_3$ | n/a | — | — | — | NRT |
| 11 | Mud Weight | $\rho$ | lb/gal | lb/ft³ | kg/L | kg/m³ | RT |
| 12 | Measured Depth | $D_{md}$ | ft | m | — | — | RT |
| 13 | True Vertical Depth | $D_{tvd}$ | ft | m | — | — | RT |
| 14 | Drill Pipe Length | $L_{dp}$ | ft | m | — | — | NRT |
| 15 | Drill Collars Length | $L_{dc}$ | ft | m | — | — | NRT |
| 16 | Last Casing Length | Lc | ft | m | — | — | NRT |
| 17 | Jet Diameter | J | in/32 | cm | — | — | NRT |
| 18 | Average Particle Diameter | $d_{cut}$ | in | cm | — | — | NRT |
| 19 | Average Particle Thickness | T | in | cm | — | — | NRT |
| 20 | Rate of Penetration | ROP | ft/hr | m/hr | — | — | RT |
| 21 | Time From Slips to Slips | t | s | min | — | — | NRT |
| 22 | Stand Length | $L_s$ | ft | m | — | — | NRT |
| 23 | Current Bit Depth | $D_{bc}$ | ft | m | — | — | RT |
| 24 | Previous Bit Depth | $D_{bp}$ | ft | m | — | — | RT |
| 25 | 30-Minute Gel Strength | $\tau_{30}$ | lbF/100 ft² | N/m² | — | — | NRT |

Summary of Outputs

Table 3 below breaks down all of the output data that is found in the sections that follow. The number field represents the equation number. If the units for a particular output are listed as "n/a" then the output is dimensionless. Many of these outputs will be used in equations as inputs; they are listed here, instead of the input list, to separate user inputs from equation outputs used as inputs. Also, the symbols listed are generic. In practical use, they will have subscripts describing the location (such as "dp" for drill pipe or "dch" for the annulus between the drill collar and open hole). Table 3 below illustrates list of outputs.

TABLE 3

| Eq. # | Name | Symbol | Units | | | |
|---|---|---|---|---|---|---|
| 1, 2 | Velocity | v | ft/min | m/min | — | — |
| 3, 5 | Power Law Constant n | n | n/a | — | — | — |
| 4, 6 | Power Law Constant k | k | P | Reyn | — | — |
| 7, 8, 45 | Effective Viscosity | μ | cP | Reyn | — | — |
| 9, 10, 46 | Reynolds Number | Re | n/a | — | — | — |
| 11, 12, 47, 48 | Critical Reynolds Number | $Re_{max}$ | n/a | — | — | — |
| 13 | Critical Annular Velocity | $v_{crit}$ | ft/min | m/min | — | — |
| 14 | Critical Annular Flow Rate | $Q_{crit}$ | gal/min | ft³/min | L/min | m³/min |
| 15-20, 49-10 | Fanning Friction Factor | f | n/a | — | — | — |
| 21, 22, 52 | Pressure Loss Gradient | Δ(p/L) | psi/ft | ppg/ft | Pa/m | — |
| 23-27, 53-55 | Pressure Loss Due to Friction | Δp | psi | ppg | Pa | — |
| 28 | Equivalent Circulating Density | ECD | lb/gal | lb/ft³ | kg/L | kg/m³ |
| 29 | Total Flow Area | A | in² | ft² | cm² | — |
| 30 | Jet Velocity | $v_{jet}$ | ft/min | m/min | — | — |
| 31 | Lost Pressure at the Bit | $Δp_b$ | psi | ppg | Pa | — |
| 32 | Hydraulic Power | P | hp | W | — | — |
| 33 | Hydraulic Power per Unit Area | $P_A$ | hp/in² | W/cm² | — | — |
| 34 | Impact Force | $F_i$ | lbF | N | — | — |
| 35 | Boundary Shear Rate | $γ_b$ | s⁻¹ | min⁻¹ | — | — |
| 36 | Shear Stress Developed by the Particle | $τ_p$ | lbF/100 ft² | N/m² | — | — |
| 37 | Shear Rate Developed by the Particle | $γ_p$ | s⁻¹ | min⁻¹ | — | — |
| 38, 39 | Slip Velocity | $v_s$ | ft/min | m/min | — | — |
| 40 | Transport Velocity | $v_t$ | ft/min | m/min | — | — |
| 41 | Transport Efficiency | $E_t$ | % | dec | — | — |
| 42 | Cuttings Concentration | C | % | dec | — | — |
| 43 | Average Maximum Speed of Pipe Movement | $v_p$ | ft/min | m/min | — | — |
| 44 | Equivalent Fluid Velocity | $v_e$ | ft/min | m/min | — | — |
| 56, 57 | Equivalent Mud Weight | $ρ_e$ | lb/gal | lb/ft³ | kg/L | kg/m³ |
| 58 | Gel-Breaking Pressure | $p_g$ | psi | ppg | Pa | — |

Conversion Factors

There will be one equation for each output, meaning there can be one set of units used to calculate the output. Therefore, the calculation engine has a series of conversion factors preprogrammed to convert units into those used by the equation. Table 4 and Table 5 below show these factors. The term "CF" as it is used in the next two tables (Table 4 and Table 5) stands for "Conversion Factor." Table 4 below illustrates input unit conversion factors.

TABLE 4

| Alt. Unit 1 | CF1 | Alt. Unit 2 | CF2 | Alt. Unit 3 | CF3 | Equation Input Unit |
|---|---|---|---|---|---|---|
| ft | 12 | cm | 0.3937 | — | — | in |
| cm | 12.598 | — | — | — | — | in/32 |
| m | 3.2808 | — | — | — | — | ft |
| min | 60 | — | — | — | — | s |
| ft³/min | 7.4805 | L/min | 0.1198 | m³/min | 199.83 | gal/min |
| lb/ft³ | 0.1337 | kg/L | 3.7854 | kg/m³ | 0.0038 | lb/gal |

TABLE 4-continued

| Alt. Unit 1 | CF1 | Alt. Unit 2 | CF2 | Alt. Unit 3 | CF3 | Equation Input Unit |
|---|---|---|---|---|---|---|
| m/hr | 3.2808 | — | — | — | — | ft/hr |
| N/m² | 2.0885 | — | — | — | — | lbF/100 ft² |

There is a list of output conversions to display the output in the units preferred by the operator. The following table has this list. Table 5 below illustrates output unit conversion factors.

TABLE 5

| Equation Output Unit | Alt. Unit 1 | CF1 | Alt. Unit 2 | CF2 | Alt. Unit 3 | CF3 |
|---|---|---|---|---|---|---|
| ft/min | m/min | 0.3048 | — | — | — | — |
| P | Reyn | 1.45E–05 | — | — | — | — |
| cP | Reyn | 1.45E–07 | — | — | — | — |
| gal/min | ft$^3$/min | 0.1337 | L/min | 3.7854 | m$^3$/min | 0.0038 |
| psi/ft | ppg/ft | 19.25 | Pa/m | 22621 | — | — |
| psi | ppg | 19.25 | Pa | 6894.8 | — | — |
| lb/gal | lb/ft$^3$ | 7.4805 | kg/L | 0.1198 | kg/m$^3$ | 119.83 |
| in$^2$ | cm$^2$ | 6.4516 | — | — | — | — |
| hp | W | 745.7 | — | — | — | — |
| hp/in$^2$ | W/cm$^2$ | 115.584 | — | — | — | — |
| lbF | N | 4.448 | — | — | — | — |
| s$^{-1}$ | min$^{-1}$ | 60 | — | — | — | — |
| % | dec | 0.01 | — | — | — | — |

The conversion goes from the unit on the left (alternate unit on Table 4; equation output unit on Table 5) to the unit on the right (equation input unit on Table 4; alternate unit on Table 5) using the conversion factor listed to the right of the alternate unit being utilized.

Annular Hydraulics

Figure 3:
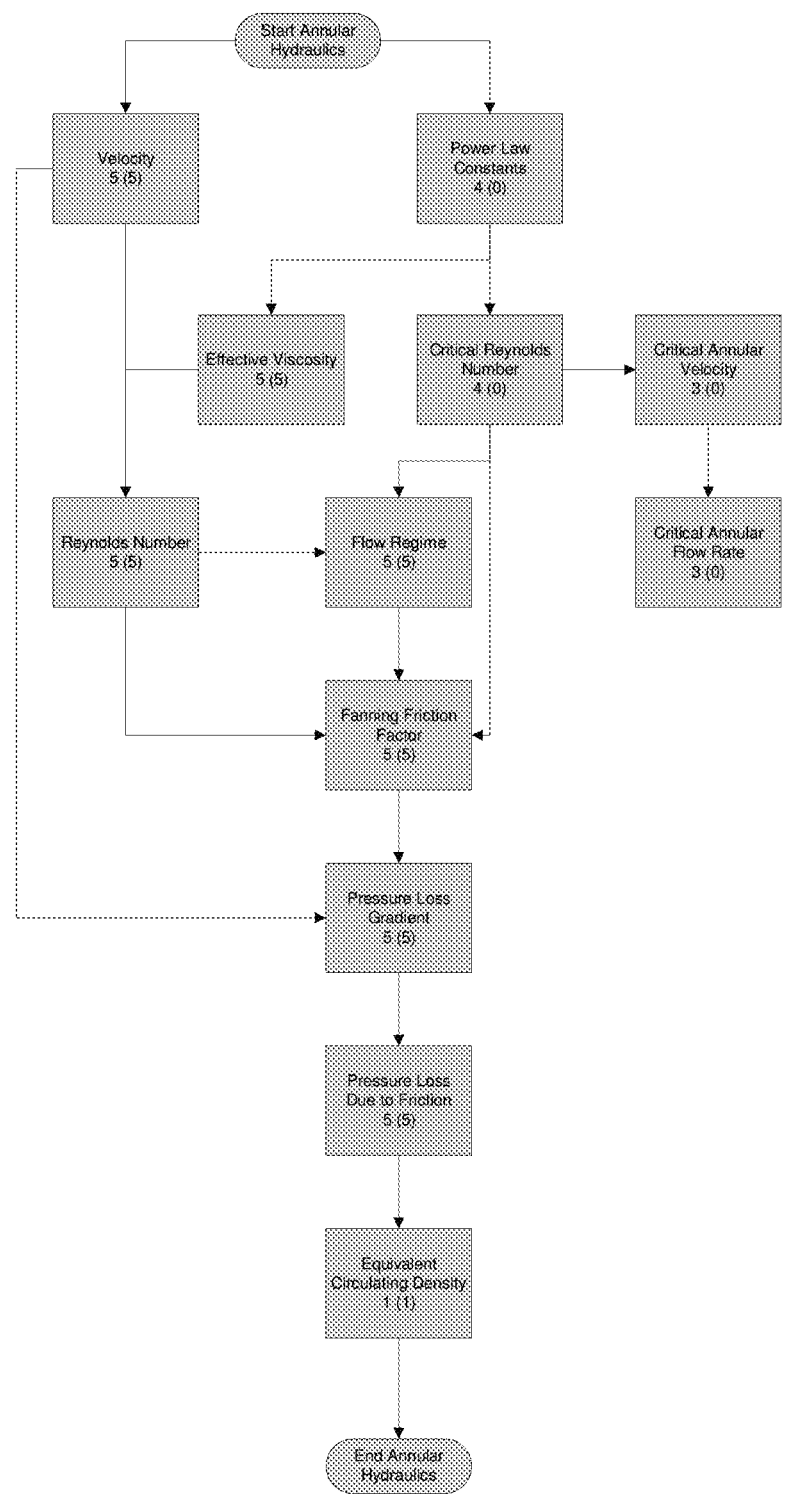
FIG. 3 illustrates an annular hydraulics workflow.

FIG. 3 illustrates an annular hydraulics workflow. Inside each of the process boxes of the flowchart, there are two numbers. The number on the left represents the total number of outputs that come from that single process. The number in parentheses on the right represents the number of outputs that are in real-time. There are 15 total inputs (2 RT) in this section that produce 50 total outputs (36 RT).

1. Velocity

Velocity refers to the rate by which the fluid changes position over time. This is a component in maintaining drilling operations. If the velocity is too low within the annulus (the region between the drill string and hole or casing), cuttings will not be lifted away from the bit, possibly leading to stuck pipe, and if the velocity is too high, the drilling fluid will become turbulent and could cause erosion of the formation.

Equation 1 below illustrates velocity inside the drill pipe and drill collar.

$$v = \frac{24.51 Q}{d^2} \qquad \text{Equation 1}$$

where, d: drill pipe inside diameter OR drill collar inside diameter.

Equation 2 below illustrates velocity inside the annulus.

$$v = \frac{24.51 Q}{d_2^2 - d_1^2} \qquad \text{Equation 2}$$

where, OPEN HOLE: $d_1$—drill pipe outside diameter OR drill collar outside diameter
$d_2$—drill bit outside diameter; and
where, CASED HOLE: $d_1$—drill pipe outside diameter
$d_2$—casing diameter.

Notes: Inputs: diameters are measured in (in) and flow rate is measured in $$\left(\frac{\text{gal}}{\text{min}}\right).$$

Output: velocity is measured in $$\left(\frac{\text{ft}}{\text{min}}\right).$$

For more information on input and output values, please refer to the Table 2 and Table 3, respectively.

Interface Requirements: The diameters of the drill pipe, drill collar, casing, and bit (hole) change at certain depths in the drilling process. Therefore, the interface needs inputs for the depths at which the diameters will change and what the new ones will be. Then, calculations will be run for all active sections of pipe, collar, and casing. See FIG. 4 illustrating interface inputs for velocity.

2. Power Law Constants

The Power Law describes the behavior of non-Newtonian fluids in terms of effective viscosity. The 'n' constant defines the degree of shear thinning. A low 'n' means that the mud will become less viscous with increasing shear stress, and vice versa. The 'k' constant defines the viscosity of the mud at a shear stress of 1 s$^{-1}$.

Equation 3 below illustrates the 'n' constant in the string.

$$n_s = 3.32 \log_{10}\left(\frac{\theta_{600}}{\theta_{300}}\right) \qquad \text{Equation 3}$$

Equation 4 below illustrates the 'k' constant in the string.

$$k_s = \frac{5.11 \theta_{600}}{1022^{n_s}} \qquad \text{Equation 4}$$

Equation 5 below illustrates the 'n' constant in the annulus.

$$n_a = 0.5\log_{10}\left(\frac{\theta_{300}}{\theta_3}\right)$$ Equation 5

Equation 6 below illustrates the 'k' constant in the annulus.

$$k_a = \frac{5.11\theta_{300}}{511^{n_a}}$$ Equation 6

Notes: Inputs: $\theta_{600}$, $\theta_{300}$, and $\theta_3$ are values that come from the mud report. They are (dimensionless). Outputs: 'n' values are (dimensionless). 'k' values are measured in (P). These values are not calculated in real-time. For more information on input and output values, please refer to the Table 2 and Table 3, respectively.

Interface Requirements: In order to calculate the power law constants ('n' and 'k'), the interface has a place to connect a link to the daily mud report in order to obtain the lecture values. See FIG. 5 illustrating interface inputs for power law constants.

3. Effective Viscosity

Viscosity cannot be calculated normally for non-Newtonian fluids. As a result, calculations are performed to determine the effective viscosity (a comparable value for use in equations).

Equation 7 below illustrates effective viscosity inside the drill pipe and drill collar.

$$\mu = 100k_s\left(\frac{96v}{60d}\right)^{n_s-1}$$ Equation 7 where, d: drill pipe inside diameter OR drill collar inside diameter.

Equation 8 below illustrates effective viscosity inside the annulus.

$$\mu = 100k_a\left[\frac{144v}{60(d_2-d_1)}\right]^{n_a-1}$$ Equation 8 where, OPEN HOLE: $d_1$—drill pipe outside diameter OR drill collar outside diameter $d_2$—drill bit outside diameter; and where, CASED HOLE: $d_1$—drill pipe outside diameter $d_2$—casing diameter.

Notes: Inputs: diameters are measured in (in) and velocity is measured in $$\left(\frac{\text{ft}}{\text{min}}\right).$$

Output: viscosity is measured in (cP). For more information on input and output values, please refer to the Table 2 and Table 3, respectively.

Interface Requirements: No additional interface requirements.

4. Reynolds Number and Critical Reynolds Numbers

The Reynolds number represents the ratio between the inertial and viscous forces. High Reynolds numbers represent more erratic flow within the turbulent regime. Lower numbers represent smoother flow within the laminar regime. The critical Reynolds numbers represent the boundaries between laminar, transitional, and turbulent flow within the string and annulus.

Equation 9 below illustrates Reynolds number inside the drill pipe and drill collar.

$$Re = \frac{928v \cdot d \cdot p}{60\mu\left(\frac{3n_s+1}{4n_s}\right)^{n_s}}$$ Equation 9 where, d: drill pipe inside diameter OR drill collar inside diameter.

Equation 10 below illustrates Reynolds number inside the annulus.

$$Re = \frac{928v(d_2-d_1)\rho}{60\mu\left(\frac{2n_a+1}{3n_a}\right)^{n_a}}$$ Equation 10 where, OPEN HOLE: $d_1$—drill pipe outside diameter OR drill collar outside diameter $d_2$—drill bit outside diameter; and where, CASED HOLE: $d_1$—drill pipe outside diameter $d_2$—casing diameter.

Equation 11 below illustrates minimum critical Reynolds number.

$$Re_{min}=3470-1370n$$ Equation 11

Equation 12 below illustrates maximum critical Reynolds number $$Re_{max}=4270-1370n$$ Equation 12

Notes: Inputs: diameters are measured in (in), velocity is measured in $$\left(\frac{\text{ft}}{\text{min}}\right),$$

mud weight is measured in $$\left(\frac{\text{lb}}{\text{gal}}\right),$$

viscosity is measured in (cP), and the flow behavior index is (dimensionless). Output: Reynolds number is (dimensionless). For more information on input and output values, please refer to the Table 2 and Table 3, respectively. If the Reynolds number calculated in the previous section is: (a) below the minimum critical value, the flow is laminar; (b) between the minimum and maximum, the flow is transitional; and (c) above the maximum, the flow is turbulent.

Interface Requirements: In order to calculate the Reynolds Numbers, the interface has a location to input mud weight values. Also, since the formations are different at different depths, the mud weights vary by depth, meaning the interface accounts for this as well. See FIG. 6 illustrating interface inputs for Reynolds number and critical Reynolds numbers.

5. Annular Critical Values

The annular critical velocity and annular critical flow rate values are limits within which laminar flow exists.

Equation 13 below illustrates annular critical velocity.

$$v_{crit} = 60\left[\frac{100\text{Re}_{a_{min}} \cdot k_a\left(\frac{2n_a+1}{3n_a}\right)^{n_a}}{928\rho(d_2-d_1)\left(\frac{144}{d_2-d_1}\right)^{1-n_a}}\right]^{\frac{1}{2-n_a}} \quad \text{Equation 13}$$

where, OPEN HOLE: $d_1$—drill pipe outside diameter OR drill collar outside diameter
$d_2$—drill bit outside diameter; and
where, CASED HOLE: $d_1$—drill pipe outside diameter
$d_2$—casing diameter.

Equation 14 below illustrates annular critical flow rate.

$$Q_{crit} = \frac{2.45 v_{crit}(d_2^2 - d_1^2)}{60} \quad \text{Equation 14}$$

where, OPEN HOLE: $d_1$—drill pipe outside diameter OR drill collar outside diameter
$d_2$—drill bit outside diameter; and
where, CASED HOLE: $d_1$—drill pipe outside diameter
$d_2$—casing diameter.

Notes: Inputs: diameters are measured in (in), n values are (dimensionless), k values are measured in (P), Reynolds numbers are (dimensionless), mud weight is measured in $$\left(\frac{\text{lb}}{\text{gal}}\right),$$

and velocity is measured in $$\left(\frac{\text{ft}}{\text{min}}\right).$$

Outputs: velocity is measured in $$\left(\frac{\text{ft}}{\text{min}}\right)$$

and annular flow rate is measured in $$\left(\frac{\text{gal}}{\text{min}}\right).$$

For more information on input and output values, please refer to the Table 2 and Table 3, respectively.

Interface Requirements: No additional interface requirements.

6. Fanning Friction Factor

The fanning friction factor relates the pressure loss due to friction to the average velocity of fluid flow. This is essentially the same as a friction coefficient for two materials sliding across each other.

Equation 15 below illustrates fanning friction inside the drill pipe and drill collar for laminar flow.

$$f = \frac{16}{\text{Re}} \quad \text{Equation 15}$$

Equation 16 below illustrates fanning friction factor inside the annulus for laminar flow.

$$f = \frac{24}{\text{Re}} \quad \text{Equation 16}$$

Equation 17 below illustrates fanning friction factor inside the drill pipe and drill collar for transitional flow.

$$f = \left(\frac{\text{Re} - \text{Re}_{s_{min}}}{800}\right) \quad \text{Equation 17}$$

$$\left(\frac{\log_{10}[n_s] + 3.93}{50\text{Re}_{s_{max}}\left[\frac{1.75 - \log_{10}(n_s)}{7}\right]} - \frac{16}{\text{Re}_{s_{min}}}\right) + \frac{16}{\text{Re}_{s_{min}}}$$

Equation 18 below illustrates fanning friction factor inside the annulus for transitional flow.

$$f = \left(\frac{\text{Re} - \text{Re}_{a_{min}}}{800}\right) \quad \text{Equation 18}$$

$$\left(\frac{\log_{10}[n_a] + 3.93}{50\text{Re}_{a_{max}}\left[\frac{1.75 - \log_{10}(n_a)}{7}\right]} - \frac{24}{\text{Re}_{a_{min}}}\right) + \frac{24}{\text{Re}_{a_{min}}}$$

Equation 19 below illustrates fanning friction factor inside the drill pipe and drill collar for turbulent flow.

$$f = \frac{\log_{10}(n_s) + 3.93}{50\text{Re}\left(\frac{1.75 - \log_{10}[n_s]}{7}\right)} \quad \text{Equation 19}$$

Equation 20 below illustrates fanning friction factor inside the annulus for turbulent flow.

$$f = \frac{\log_{10}(n_a) + 3.93}{50\text{Re}\left(\frac{1.75 - \log_{10}[n_a]}{7}\right)} \quad \text{Equation 20}$$

Notes: Inputs: n values are (dimensionless) and Reynolds numbers are (dimensionless). Output: Fanning friction factor is (dimensionless). For more information on input and output values, please refer to the Table 2 and Table 3, respectively.

Interface Requirements: No additional interface requirements.

7. Pressure Loss Gradient

The pressure loss gradient is a measure of how much pressure is lost across a unit length of the hole depth (measured depth).

Equation 21 below illustrates pressure loss gradient inside the drill pipe and drill collar.

$$\Delta \frac{p}{L} = f\left(\frac{v}{60}\right)^2 \left(\frac{p}{25.81d}\right) \quad \text{Equation 21}$$

where, d: drill pipe inside diameter OR drill collar inside diameter.

Equation 22 below illustrates pressure loss gradient inside the annulus.

$$\Delta \frac{p}{L} = f\left(\frac{v}{60}\right)^2 \left(\frac{p}{25.81(d_2 - d_1)}\right) \quad \text{Equation 22}$$

where, OPEN HOLE: $d_1$—drill pipe outside diameter OR drill collar outside diameter $d_2$—drill bit outside diameter; and where, CASED HOLE: $d_1$—drill pipe outside diameter $d_2$—casing diameter.

Notes: Inputs: diameters are measured in (in), mud weight is measured in $$\left(\frac{\text{lb}}{\text{gal}}\right),$$

and velocity is measured in $$\left(\frac{\text{ft}}{\text{min}}\right).$$

Output: pressure loss gradient is measured in $$\left(\frac{\text{psi}}{\text{ft}}\right).$$

For more information on input and output values, please refer to the Table 2 and Table 3, respectively.

Interface Requirements: No interface requirements.

8. Pressure Loss Due to Friction

The pressure loss due to friction is the pressure loss gradient multiplied by the length of pipe of interest. The result of this product is the total pressure loss over that length of pipe.

Equation 23 below illustrates pressure loss due to friction inside the drill pipe.

$$\Delta p_{dp} = \Delta \frac{p}{L_{dp}}(L_{dp}) \quad \text{Equation 23}$$

Equation 24 below illustrates pressure loss due to friction inside the drill collar.

$$\Delta p_{dc} = \Delta \frac{p}{L_{dc}}(L_{dc}) \quad \text{Equation 24}$$

Equation 25 below illustrates pressure loss due to friction between the drill pipe and casing.

$$\Delta p_{dpc} = \Delta \frac{p}{L_{dpch}}(L_c) \quad \text{Equation 25}$$

Equation 26 below illustrates pressure loss due to friction between the drill pipe and open hole.

$$\Delta p_{dph} = \Delta \frac{p}{L_{dpoh}}(L_{dp} - L_c) \quad \text{Equation 26}$$

Equation 27 below illustrates pressure loss due to friction between the drill collar and open hole.

$$\Delta p_{dch} = \Delta \frac{p}{L_{dcoh}}(L_{dc}) \quad \text{Equation 27}$$

Notes: Inputs: pressure loss gradient is measured in $$\left(\frac{\text{psi}}{\text{ft}}\right)$$

and distance and length are measured in (ft). Output: pressure loss due to friction is measured in (psi). For more information on input and output values, please refer to the Table 2 and Table 3, respectively.

Interface Requirements: No additional interface requirements.

9. Equivalent Circulating Density

The equivalent circulating density is defined as the effective density that the circulating fluid in the annulus exerts against the formation.

Equation 28 below illustrates equivalent circulating density.

$$EDC = \rho + \frac{\Delta p_{dpch} + \Delta p_{dpoh} + \Delta p_{dcoh}}{0.052 D_{tvd}} \quad \text{Equation 28}$$

Notes: Inputs: pressure loss due to friction is measured in (psi), mud weight is measured in $$\left(\frac{\text{lb}}{\text{gal}}\right),$$

and distance is measured in (ft). Output: equivalent circulating density is measured in $$\left(\frac{\text{lb}}{\text{gal}}\right).$$

For more information on input and output values, please refer to the Table 2 and Table 3, respectively.

Interface Requirements: No additional interface requirements.

Figure 7:
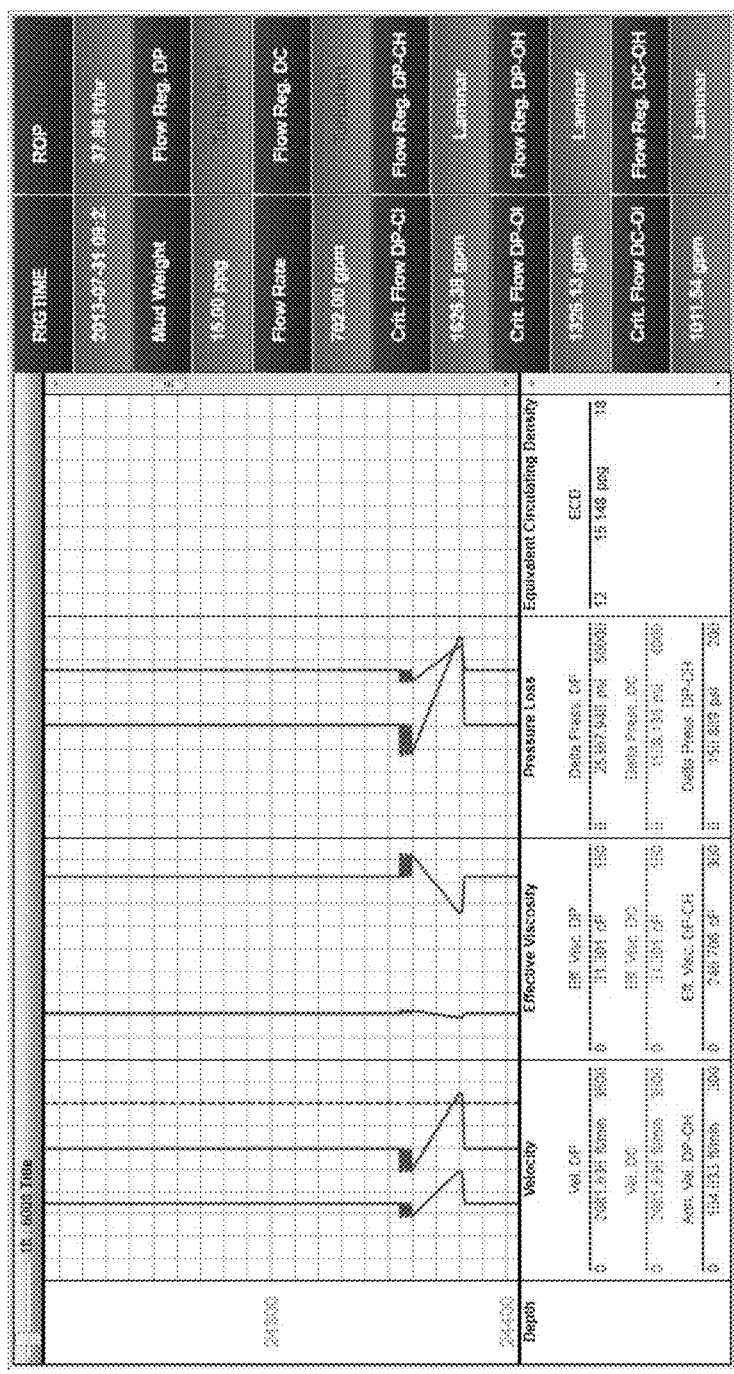
FIG. 7 illustrates an annular hydraulics display.

FIG. 7 illustrates an annular hydraulics display.

Hydraulics at the Bit

Figure 8:
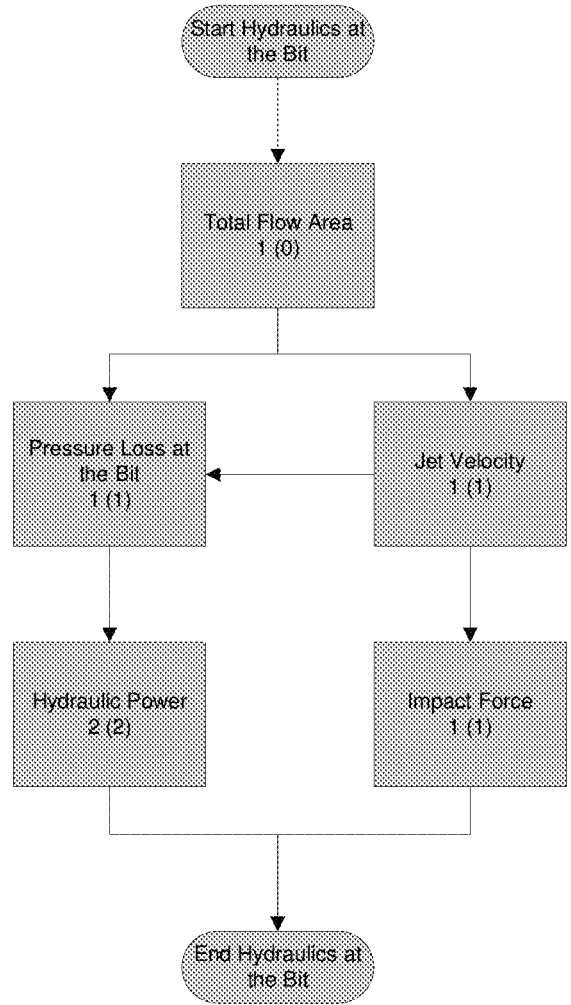
FIG. 8 illustrates hydraulics at the bit workflow.

FIG. 8 illustrates hydraulics at the bit workflow. Inside each of the process boxes of the flowchart above, there are two numbers. The number on the left represents the total number of outputs that come from that single process. The number in parentheses on the right represents the number of outputs that are in real-time. There are 4 total inputs (1 RT) in this section that produce 6 total outputs (5 RT).

1. Total Flow Area

Total flow area represents the sum of the areas of the jets through which fluid travels. This is a factor in calculating the jet velocity in the next section.

Equation 29 below illustrates total flow area.

$$A = \frac{J_1^2 + J_2^2 + J_3^2 + J_4^2 + \cdots + J_x^2}{1303.8} \qquad \text{Equation 29}$$

Notes: Input: jet diameter is measured in $$\left(\frac{in}{32}\right).$$

Output: total flow area is measured in (in$^2$). The subscript "x" in the equation above represents the x$^{th}$ jet (the last jet in the series). For more information on input and output values, please refer to the Table 2 and Table 3, respectively.

Figure 9:
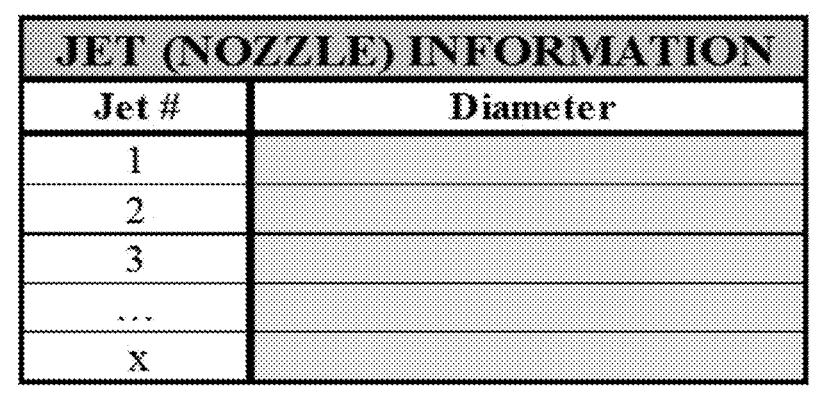

Interface Requirements: In order to run this calculation, the interface needs an input for the jet diameters. See FIG. 9 illustrating interface inputs for total flow area.

2. Jet Velocity

Jet velocity is a measure of how quickly fluid is travelling through the jets, and is determined by the volumetric flow rate and the total flow area. It is the same for all jets, regardless of their individual diameters.

Equation 30 below illustrates jet velocity.

$$v_{jet} = \frac{19.249Q}{A} \qquad \text{Equation 30}$$

Notes: Inputs: total flow area is measured in (in$^2$) and flow rate is measured in $$\left(\frac{gal}{min}\right).$$

Output: jet velocity is measured in $$\left(\frac{ft}{min}\right).$$

For more information on input and output values, please refer to the Table 2 and Table 3, respectively.

Interface Requirements: No additional interface requirements.

3. Lost Pressure at the Bit

This pressure loss occurs as the fluid travels through the jet nozzles and effects the overall hydraulic power of the bit. A nozzle coefficient of 0.95 is considered standard for this calculation and has been included in the coefficients below.

Equation 31 below illustrates lost Pressure at the bit.

$$\Delta p_b = \frac{156\rho \cdot Q^2}{(1303.8A)^2} \qquad \text{Equation 31}$$

Notes: Inputs: total flow area is measured in (in$^2$), mud weight is measured in $$\left(\frac{lb}{gal}\right),$$

and flow rate is measured in $$\left(\frac{gal}{min}\right).$$

Output: pressure loss at the bit is measured in (psi). For more information on input and output values, please refer to the Table 2 and Table 3, respectively.

Interface Requirements: No additional interface requirements.

4. Hydraulic Power

Hydraulic power is a measure of energy per unit time that is available to the bit during drilling as a result of the fluid travelling through the jets. Hydraulic power per unit area is also a measure of this, but is normalized to the hole area. Since some operators prefer the first measurement and others prefer the second, both are included here.

Equation 32 below illustrates hydraulic power.

$$P = \frac{Q \cdot \Delta p_b}{1714} \qquad \text{Equation 32}$$

Equation 33 below illustrates hydraulic power per unit area.

$$P_A = \frac{1.2732P}{d_h^2} \qquad \text{Equation 33}$$

Notes: Inputs: pressure loss at the bit is measured in (psi), bit outside diameter is measured in (in), and flow rate is measured in $$\left(\frac{gal}{min}\right).$$

Outputs: power is measured in (hp) and power per unit area is measured in $$\left(\frac{hp}{in^2}\right).$$

For more information on input and output values, please refer to the Table 2 and Table 3, respectively.

Interface Requirements: No additional interface requirements.

5. Impact Force

Impact force is a measure of the force applied to the formation by the fluid coming out of the jets. It is used as another way of determining bit power.

Equation 34 below illustrates impact force.

$$F_i = \frac{\rho \cdot Q \cdot v_{jet}}{115920} \qquad \text{Equation 34}$$

Notes: Inputs: velocity is measured in $$\left(\frac{\text{ft}}{\text{min}}\right),$$

mud weight is measured in $$\left(\frac{\text{lb}}{\text{gal}}\right),$$

and the flow rate is measured in $$\left(\frac{\text{gal}}{\text{min}}\right).$$

Output: impact force is measured in (lbF). For more information on input and output values, please refer to the Table 2 and Table 3, respectively.

Interface Requirements: No additional interface requirements.

Figure 10:
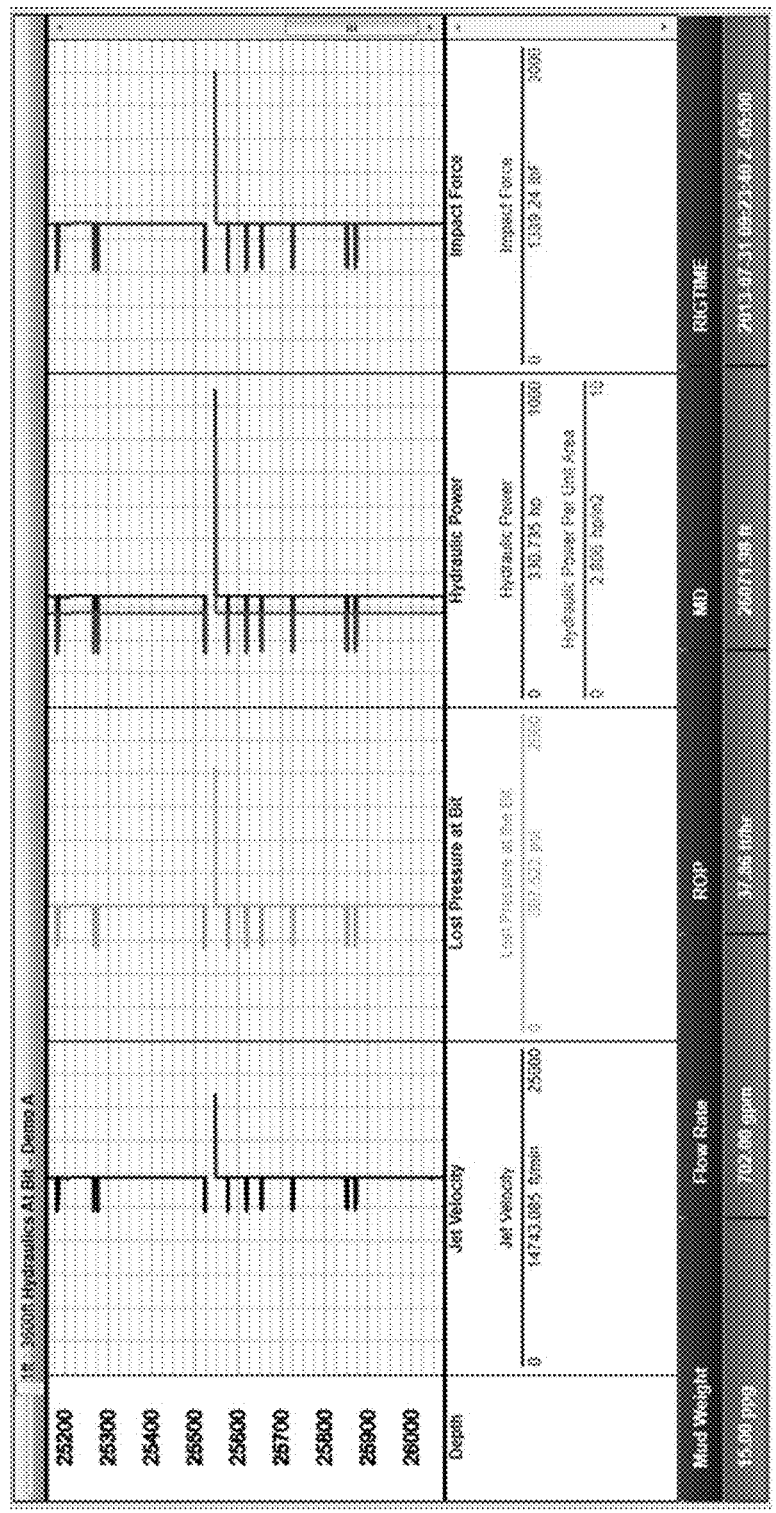
FIG. 10 illustrates hydraulics at the bit display.

FIG. 10 illustrates hydraulics at the bit display.

Cutting Transportation

Figure 11:
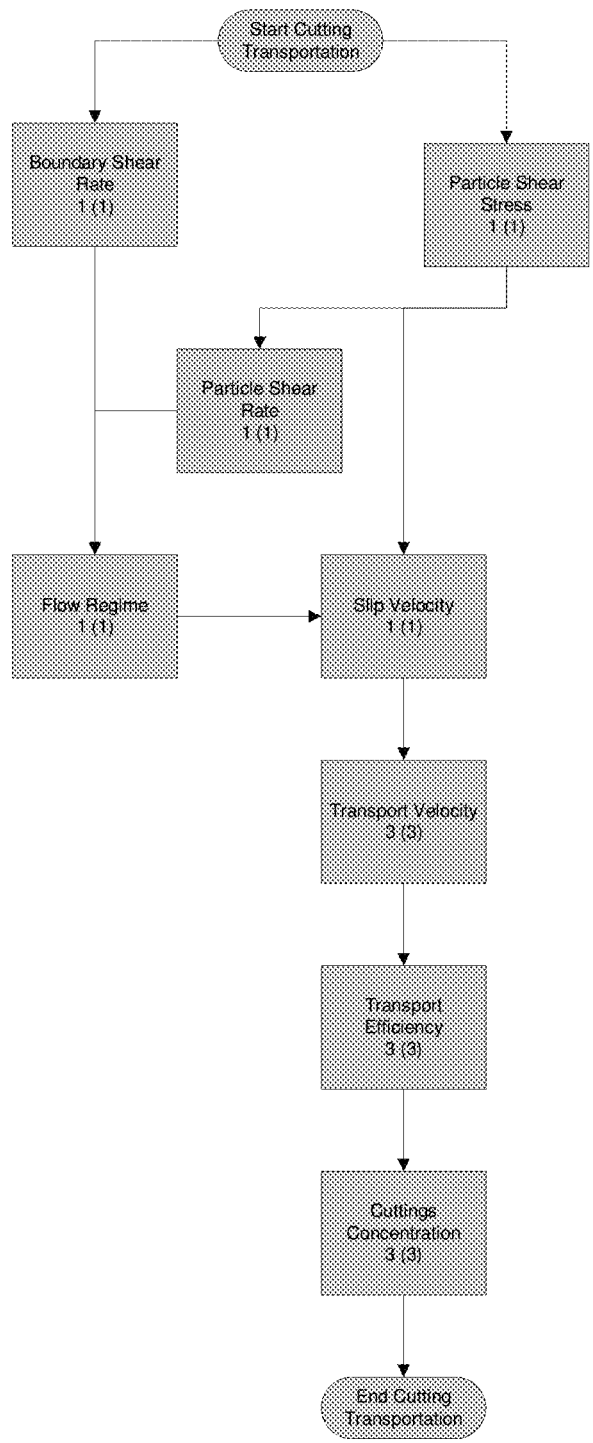
FIG. 11 illustrates a cutting transportation workflow.

FIG. 11 illustrates a cutting transportation workflow. Inside each of the process boxes of the flowchart on the right, there are two numbers. The number on the left represents the total number of outputs that come from that single process. The number in parentheses on the right represents the number of outputs that are in real-time. There are 11 total inputs (5 RT) in this section that produce 14 total outputs (14 RT).

1. Boundary Shear Rate

The boundary shear rate is a measure of the velocity change per unit distance experienced by the fluid at the wall of the hole.

Equation 35 below illustrates boundary shear rate.

$$\gamma_b = \frac{186}{d_{cut} \cdot \rho^{0.5}} \qquad \text{Equation 35}$$

Notes: Inputs: average particle diameter is measured in (in) and mud weight is measured in $$\left(\frac{\text{lb}}{\text{gal}}\right).$$

Output: boundary shear rate is measured in (s$^{-1}$). For more information on input and output values, please refer to the Table 2 and Table 3, respectively.

Interface Requirements: The boundary shear rate calculation uses the average cutting diameter. The interface accepts this value as an input. See FIG. 12 illustrating interface inputs for boundary shear rate.

2. Shear Stress Developed by the Particle

The shear stress developed by the particle is a measure of the force applied by the particle on the fluid.

Equation 36 below illustrates shear stress developed by the particle.

$$\tau_p = 79[T(20.8-\rho)]^{0.5} \qquad \text{Equation 36}$$

Notes: Inputs: average particle thickness is measured in (in) and mud weight is measured in $$\left(\frac{\text{lb}}{\text{gal}}\right).$$

Output: particle shear stress is measured in $$\left(\frac{\text{lbF}}{100 \text{ ft}^2}\right).$$

For more information on input and output values, please refer to the Table 2 and Table 3, respectively.

Interface Requirements: The average cutting thickness is an input that the interface accounts for. See FIG. 13 illustrating interface inputs for shear stress developed by the particle.

3. Shear Rate Developed by the Particle

The shear rate developed by the particle is a measure of the velocity change per unit distance experienced by the fluid as a result of the particle.

Equation 37 below illustrates shear rate developed by the particle.

$$\gamma_p = \left(\frac{\tau_p}{k_a}\right)^{\frac{1}{n_a}} \qquad \text{Equation 37}$$

Notes: Inputs: particle shear stress is measured in $$\left(\frac{\text{lbF}}{100 \text{ ft}^2}\right),$$

the 'n' power law constant is (dimensionless), and the 'k' power law constant is measured in (P). Output: particle shear rate is measured in (s$^{-1}$). The regime is considered laminar if $\gamma_p \leq \gamma_b$ and turbulent if $\gamma_p > \gamma_b$. For more information on input and output values, please refer to the Table 2 and Table 3, respectively.

Interface Requirements: No additional interface requirements.

4. Slip Velocity

The slip velocity is the rate at which the particles tend to fall towards the drill bit. It is the component of the overall transport velocity that counteracts the fluid's annular velocity.

Equation 38 below illustrates slip velocity for laminar flow.

$$v_s = 1.22 \tau_p \left(\frac{\gamma_p \cdot d_{cut}}{\rho^{0.5}}\right)^{0.5} \qquad \text{Equation 38}$$

Equation 39 below illustrates slip velocity for turbulent flow.

$$v_s = \frac{16.62\tau_p}{\rho^{0.5}}$$ Equation 39

Note: Inputs: particle shear stress is measured in (lbF), particle shear rate is measured in (s$^{-1}$), average particle diameter is measured in (in), and mud weight is measured in $$\left(\frac{lb}{gal}\right).$$

Output: slip velocity is measured in $$\left(\frac{ft}{min}\right).$$

For more information on input and output values, please refer to the Table 2 and Table 3, respectively.

Interface Requirements: No additional interface requirements.

5. Transport Velocity

The transport velocity is the net rate at which the cutting particles travel from the bit to the surface of the hole.

Equation 40 below illustrates transport velocity.

$$v_t = v - v_s$$ Equation 40

Notes: Inputs: annular velocity is measured in $$\left(\frac{ft}{min}\right)$$

and slip velocity is measured in $$\left(\frac{ft}{min}\right).$$

Output: transport velocity is measured in $$\left(\frac{ft}{min}\right).$$

This value can be positive. Negative values mean that the cutting particles are travelling down towards the drill bit which could cause stuck pipe, among other problems. For more information on input and output values, please refer to the Table 2 and Table 3, respectively.

Interface Requirements: No additional interface requirements.

6. Transport Efficiency

The transport efficiency is the ratio of the transport velocity to the annular velocity. This value approaching 100% represents more efficient cutting transport efficiency.

Equation 41 below illustrates transport efficiency.

$$E_t = \frac{v_t}{v} \times 100$$ Equation 41

Notes: Inputs: annular velocity is measured in $$\left(\frac{ft}{min}\right)$$

and transport velocity is measured in $$\left(\frac{ft}{min}\right).$$

Output: transport efficiency is measured in (%). For more information on input and output values, please refer to the Table 2 and Table 3, respectively.

Interface Requirements: No additional interface requirements.

7. Cutting Concentration

The cuttings concentration is the ratio of cuttings to annular volume. At high concentrations many problems can occur including stuck pipe, among other things.

Equation 42 below illustrates cuttings concentration.

$$C = \frac{(ROP)d_h^2}{14.71 E_t \cdot Q} \times 100$$ Equation 42

Notes: Inputs: hole diameter is measured in (in), rate of penetration is measured in $$\left(\frac{ft}{hr}\right),$$

transport efficiency is measured in (%), and flow rate is measured in $$\left(\frac{gal}{min}\right).$$

Output: cuttings concentration is measured in (%). For more information on input and output values, please refer to the Table 2 and Table 3, respectively.

Interface Requirements: No additional interface requirements.

Figure 14:
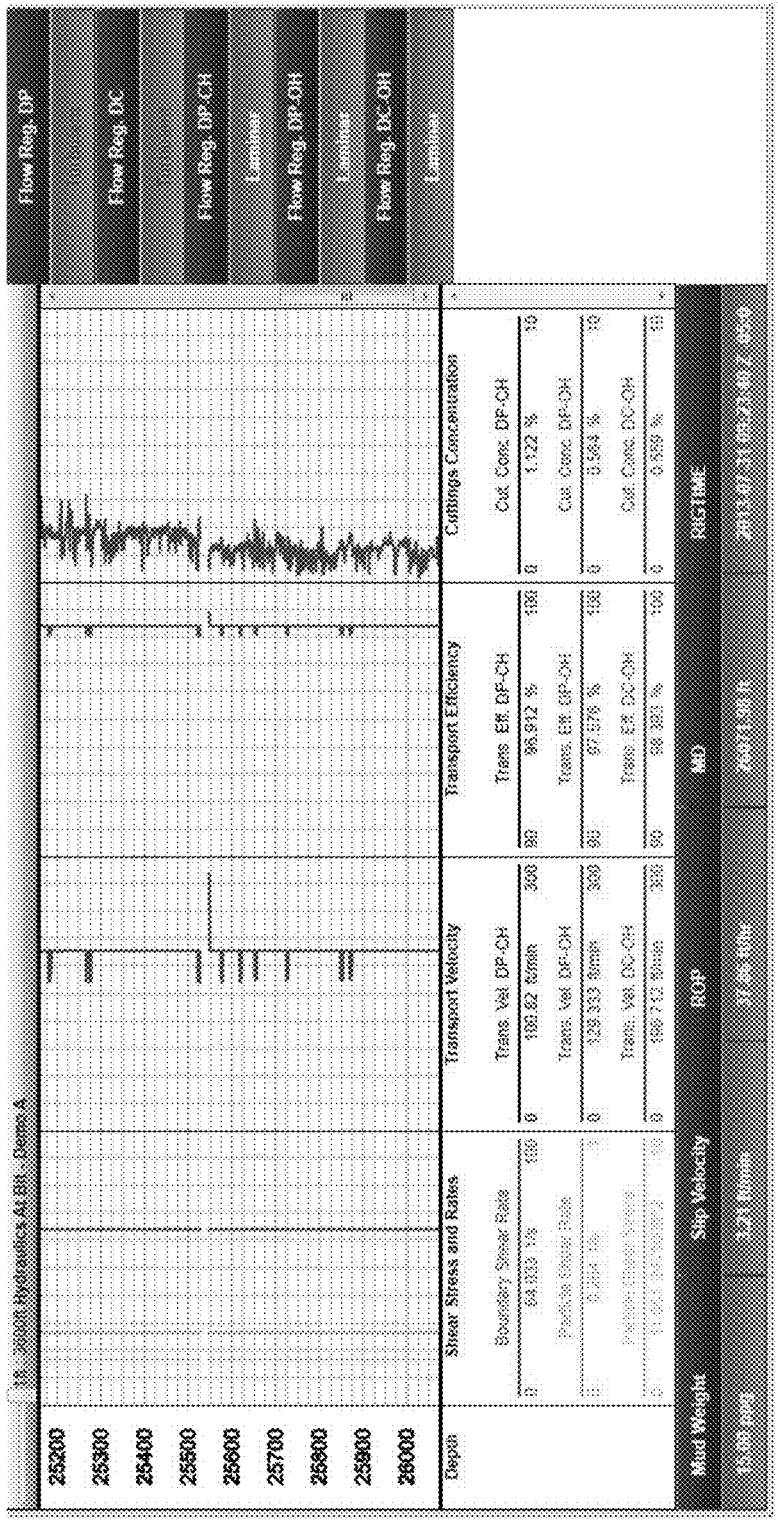
FIG. 14 illustrates a cutting transportation display.

FIG. 14 illustrates a cutting transportation display.

Swab and Surge

Figure 15:
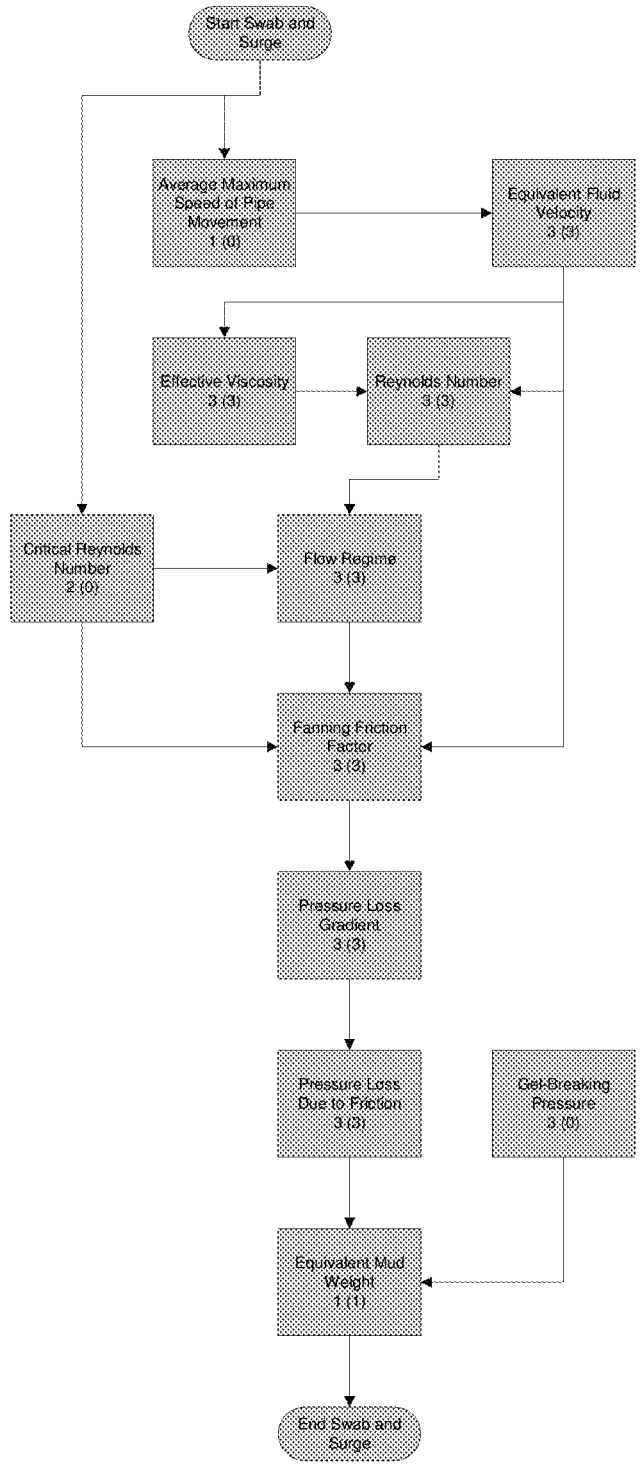
FIG. 15 illustrates a swab and surge workflow.

FIG. 15 illustrates a swab and surge workflow. Inside each of the process boxes of the flowchart on the right, there are two numbers. The number on the left represents the total number of outputs that come from that single process. The number in parentheses on the right represents the number of outputs that are in real-time. There are 16 total inputs (3 RT) in this section that produce 28 total outputs (22 RT).

Swab and surge do not occur during the drilling process, unlike the other three major analyses. This means that many values that have been calculated before are recalculated for the new conditions. It needs to be determined if swab is occurring, surge is occurring, or neither are. For this the current bit depth, $D_{bc}$, and the most recent previous bit depths, $D_{bp}$ are known.

1. Average Maximum Speed of Pipe Movement and Equivalent Fluid Velocity

The average maximum speed of pipe movement is the highest approximate speed the drill string will obtain while tripping in or tripping out. The equivalent fluid velocity is the velocity of the stationary fluid relative to the moving pipe during these procedures.

Equation 43 below illustrates average maximum speed of pipe movement.

$$v_p = \frac{90 L_s}{t} \qquad \text{Equation 43}$$

Equation 44 below illustrates equivalent fluid velocity.

$$v_e = v_p \left( 0.45 + \frac{d_1^2}{d_2^2 - d_1^2} \right) \qquad \text{Equation 44}$$

where, OPEN HOLE: $d_1$—drill pipe outside diameter OR drill collar outside diameter $d_2$—drill bit outside diameter; and where, CASED HOLE: $d_1$—drill pipe outside diameter $d_2$—casing diameter.

Notes: Inputs: stand length is measured in (ft), time from slips to slips is measured in (s), and all diameters are measured in (in). Outputs: average maximum speed of pipe movement is measured in $$\left( \frac{ft}{min} \right)$$

and equivalent fluid velocity is measured in $$\left( \frac{ft}{min} \right).$$

For more information on input and output values, please refer to the Table 2 and Table 3, respectively.

Interface Requirements: To calculate the maximum average speed of pipe movement, the stand length and the time from slips to slips can be known. See FIG. 16 illustrating interface inputs for average maximum speed of pipe movement and equivalent fluid velocity.

2. Effective Viscosity

The effective viscosity is recalculated inside the annulus from to account for the equivalent fluid velocities as opposed to the annular velocities.

Equation 45 below illustrates effective viscosity inside the annulus.

$$\mu = 100 k_a \left[ \frac{144 v_e}{60(d_2 - d_1)} \right]^{n_a - 1} \qquad \text{Equation 45}$$

where, OPEN HOLE: $d_1$—drill pipe outside diameter OR drill collar outside diameter $d_2$—drill bit outside diameter; and where, CASED HOLE: $d_1$—drill pipe outside diameter $d_2$—casing diameter.

Notes: Inputs: all diameters are measured in (in) and velocity is measured in $$\left( \frac{ft}{min} \right).$$

Output: viscosity is measured in (cP). For more information on input and output values, please refer to the Table 2 and Table 3, respectively.

Interface Requirements: No additional interface requirements.

3. Flow Regime

Reynolds number is recalculated for the equivalent fluid velocity and for any new diameters. The critical values only need to be recalculated if the fluid properties have changed.

Equation 46 below illustrates Reynolds number inside the annulus.

$$Re = \frac{928 v_e (d_2 - d_1) \rho}{60 \mu \left( \frac{2 n_a + 1}{3 n_a} \right)^{n_a}} \qquad \text{Equation 46}$$

Equation 47 below illustrates minimum critical Reynolds number.

$$Re_{min} = 3470 - 1370 n \qquad \text{Equation 47}$$

Equation 48 below illustrates maximum critical Reynolds number.

$$Re_{max} = 4270 - 1370 n \qquad \text{Equation 48}$$

Notes: Inputs: diameters are measured in (in), n values are (dimensionless), k values are measured in (P), Reynolds Numbers are (dimensionless), mud weight is measured in $$\left( \frac{lb}{gal} \right),$$

and velocity is measured in $$\left( \frac{ft}{min} \right).$$

Outputs: Reynolds numbers are (dimensionless), velocity is measured in $$\left( \frac{ft}{min} \right),$$

and annular flow rate is measured in $$\left( \frac{gal}{min} \right).$$

If the Reynolds number is: (a) below the minimum critical value, the flow is laminar; (b) between the minimum and maximum, the flow is transitional; and (c) above the maximum, the flow is turbulent. For more information on input and output values, please refer to the Table 2 and Table 3, respectively.

Interface Requirements: No additional interface requirements.

4. Swab or Surge Pressure

The swab and surge pressure losses are equivalent to the pressure loss due to friction analysis.

Equation 49 below illustrates fanning friction factor inside the annulus for laminar flow.

$$f = \frac{24}{Re} \qquad \text{Equation 49}$$

Equation 50 below illustrates fanning friction factor inside the annulus for transitional flow.

$$f = \left(\frac{Re - Re_{a_{min}}}{800}\right) \left(\frac{\log_{10}[n_a] + 3.93}{50 Re_{a_{max}}\left[\frac{1.75 - \log_{10}(n_a)}{7}\right]} - \frac{24}{Re_{a_{min}}}\right) + \frac{24}{Re_{a_{min}}} \qquad \text{Equation 50}$$

Equation 51 below illustrates fanning friction factor inside the annulus for turbulent flow.

$$f = \frac{\log_{10}(n_a) + 3.93}{50\, Re^{\left[\frac{1.75 - \log_{10}(n_a)}{7}\right]}} \qquad \text{Equation 51}$$

Equation 52 below illustrates pressure loss gradient inside the annulus.

$$\frac{\Delta p}{\Delta L} = f\left(\frac{v}{60}\right)^2 \left(\frac{\rho}{25.81(d_2 - d_1)}\right) \qquad \text{Equation 52}$$

Equation 53 below illustrates pressure loss due to swab or surge between the drill pipe and casing.

$$\Delta p_{dpc} = \frac{\Delta p}{\Delta L_{dpc}}(L_c) \qquad \text{Equation 53}$$

Equation 54 below illustrates pressure loss due to swab or surge between the drill pipe and open hole.

$$\Delta p_{dph} = \frac{\Delta p}{\Delta L_{dph}}(L_{dp} - L_c) \qquad \text{Equation 54}$$

Equation 55 below illustrates pressure loss due to swab or surge between the drill collar and open hole.

$$\Delta p_{dch} = \frac{\Delta p}{\Delta L_{dch}}(L_{dc}) \qquad \text{Equation 55}$$

Notes: Inputs: diameters are measured in (in), n values are (dimensionless), Reynolds numbers are (dimensionless), mud weight is measured in $$\left(\frac{lb}{gal}\right),$$

velocity is measured in $$\left(\frac{ft}{min}\right),$$

lengths and distances are measured (ft). Outputs: fanning friction factors are (dimensionless), pressure loss gradient is measured in $$\left(\frac{psi}{ft}\right),$$

and pressure loss due to friction is measured in (psi). For more information on input and output values, please refer to the Table 2 and Table 3, respectively.

Interface Requirements: No additional interface requirements.

5. Gel-Breaking Pressure

The gel-breaking pressure is the approximate pressure required to push the pipe into the stationary mud after a trip.

Equation 56 below illustrates gel-breaking pressure.

$$p_g = \frac{4L \cdot \tau_{30}}{1200(d_2 - d_1)} \qquad \text{Equation 56}$$

Notes: Inputs: annular section length is measured in (ft) and 30-minute gel strength is measured in $$\left(\frac{lbF}{100\ ft^2}\right).$$

Output: gel-breaking pressure is measured in (psi). For more information on input and output values, please refer to the Table 2 and Table 3, respectively.

Figure 17:
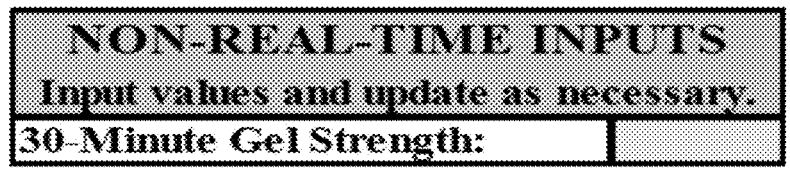
FIG. 17 illustrates interface inputs for gel-breaking pressure.

Interface Requirements: The 30-minute gel strength is used to perform the gel-breaking pressure calculation. See FIG. 17 illustrating interface inputs for gel-breaking pressure.

6. Equivalent Mud Weight

The equivalent mud weight is an adjusted value similar to equivalent circulating density that accounts for the pressure losses due to swab and surge. The higher of the two values (gel-breaking pressure or pressure loss due to friction) is needed to calculate this value. The pressure used may vary between annular sections. $\Delta p_1$, $\Delta p_2$, and $\Delta p_3$ represent the values that have been selected for each annular section.

Equation 57 below illustrates equivalent mud weight (swab).

$$\rho_e = \rho - \frac{\Delta p_1 + \Delta p_2 + \Delta p_3}{0.052 D_{tvd}} \qquad \text{Equation 57}$$

Equation 58 below illustrates equivalent mud weight (surge).

$$\rho_e = \rho + \frac{\Delta p_1 + \Delta p_2 + \Delta p_3}{0.052 D_{tvd}} \qquad \text{Equation 58}$$

Notes: Inputs: pressure loss due to friction is measured in (psi), mud weight is measured in $$\left(\frac{lb}{gal}\right),$$

and distance is measured in (ft). Output: equivalent mud weight is measured in $$\left(\frac{lb}{gal}\right).$$

For more information on input and output values, please refer to the Table 2 and Table 3, respectively.

Interface Requirements: No additional interface requirements.

Figure 18:
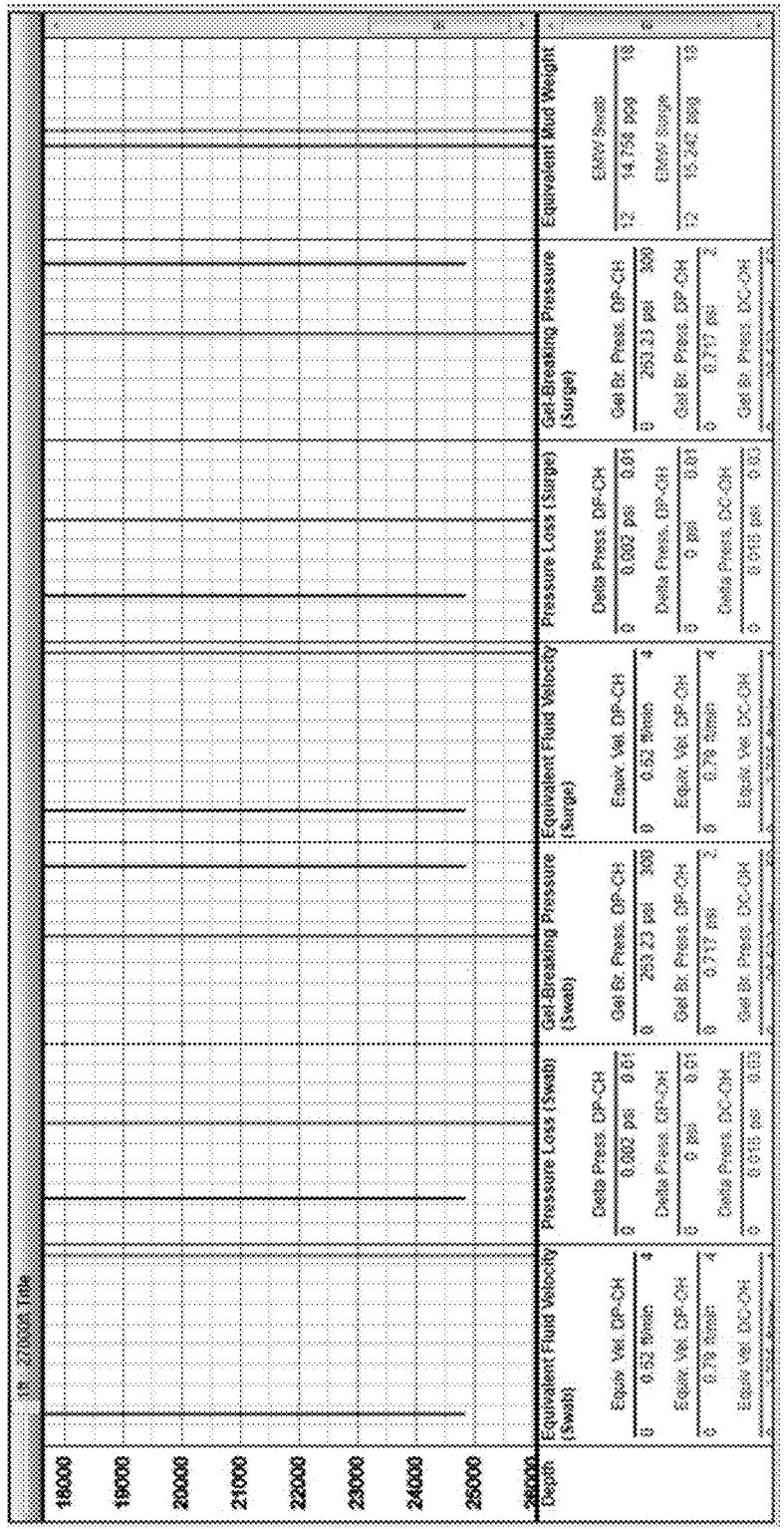
FIG. 18 illustrates a swab and surge display.

FIG. 18 illustrates a swab and surge display.

Figure 19:
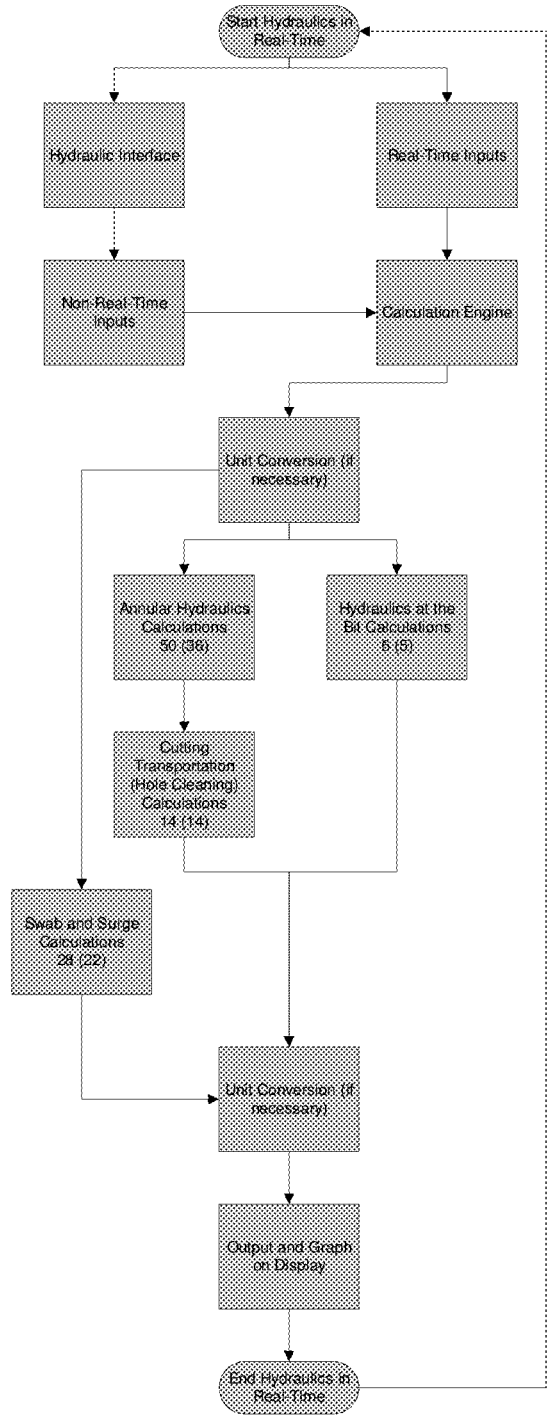
FIG. 19 illustrates a technical workflow.

FIG. 19 illustrates a technical workflow. Inside several of the process boxes of the flowchart on the right, there are two numbers. The number on the left represents the total number of outputs that come from that single process. The number in parentheses on the right represents the number of outputs that are in real-time. There are 25 total inputs (7 RT) in total that produce 98 total outputs (77 RT). To utilize the full power of the calculation engine and to provide the best service possible to the operator, the interface includes a unit selection component that tells the calculation engine when it is to perform unit conversion operations.

Torque & Drag Surveillance Suite in Real-Time

The real-time torque and drag analysis surveillance suite allows for a comparison of the planned and actual performance of the drill string because it provides an instantaneous analysis in real-time. The system can display, compare, and evaluate the hookload, friction force, and real friction coefficient in real-time based on other parameters including friction coefficients planned, activity code (RIH, ROT, POH), BHA weight, mud density, drill pipe OD, and trajectory performance.

The severity cross plot which is included in the system allows an evaluation of the changes observed in the hookload and friction factor analysis whilst monitoring the trajectory performance. The system includes algorithms to calculate the actual friction coefficient on the well for inclined and lateral sections. The hookload and friction factor system can detect and display individual hookloads when the well is tripping-in, tripping-out, and rotating.

This solution allows input data to be calculated and updated in real time. This solution allows for the integration of real-time and non-real time inputs within a real-time system. This means that this solution allows a direct comparison between the planned and actual values for variables such as hookload. Another unique feature of this solution is that the model for the planned values can be updated quickly and easily, as they are needed, through the use of correction factors. This takes a lot less time than having to adjust the calculations in the model to calibrate the system.

The real-time torque and drag surveillance suite allows a drilling company to improve the efficiency of their drilling behavior in terms of both time and money and reduce the safety risk to their staff. This solution updates its outputs within a matter of seconds. This is much faster than any other solution available for the same purpose. This means that the display that the customer views show data that is much more accurate to the actual conditions in the well at the time it's viewed. The consequence of this is that the scale of the risk in the decision making process is significantly reduced thus lessening the chance that problems such-as stuck pipe, blowouts, and landslides will occur.

This solution is built on WITSML, the standard for drilling-data exchange in the oil and gas industry. Since WITSML is used by many different programs this solution allows a large degree of integration between different systems which gives the flexibility necessary for modern drilling. Basing the solution on WITSML also means it is easy for customers to share data with partner firms and any other group.

It allows multi-rig data flow, and takes advantage of back up servers which ensure the well has zero down time. Rig analytics reports, 24/7 remote monitoring, and custom alerts mean that customers can always have their fingers on the pulse of their wells; they can even access displays on their tablet or smart phone.

The solution is also highly customizable since both the visualization and real-time calculations can be tailored to the customer's individual needs. The real-time displays show a multitude of information at a glance with tabs that enable effortless toggling between them.

Summary of Inputs

Table 6 illustrates the inputs that process the outputs for the overall torque and drag analysis. The name of every input is given, along with its respective symbol, its units, whether the data collected is in real-time (RT), or not in real-time (NRT) and whether the data is collected on the surface and/or down the hole. The abbreviation N/A in Table 6 and Table 7 stand for not applicable. Table 6 below summarizes the inputs to the real-time Torque and Drag Solution.

TABLE 6

| # | Input | Symbol | Unit | RT/NRT | Surface/Downhole |
|---|---|---|---|---|---|
| 1. | Total Drill string Weight | N/A | lb/ft | NRT | Surface |
| 2. | Mud Weight | ρ | lbF | NRT | Surface |
| 3. | Buoyancy Factor | BF | N/A | NRT | Surface |
| 4. | Top Drive Weight | N/A | lbF | NRT | Surface |
| 5. | Friction Coefficient | μ | N/A | NRT | Surface |
| 6. | Kick-off Point Depth | KOP | ft | NRT | Surface |
| 7. | Last Casing Depth | N/A | ft | NRT | Surface |
| 8. | Current Section | N/A | N/A | NRT | Surface |
| 9. | Measured Depth | MD | ft | RT | Downhole |
| 10. | Incline | Inc | Rad | RT | Downhole |
| 11. | Azimuth | Azi | Rad | RT | Downhole |
| 12. | Dog Leg Severity | DLS | °/100 ft | RT | Downhole |
| 13. | Drill Pipe Outside Diameter | OD | Inches | NRT | Surface |
| 14. | Bottom Hole Assembly Weight | BHA | lbF | NRT | Surface |

Summary of Outputs

Table 7 contains all the outputs of the torque and drag analysis. It follows a similar format to Table 6. Table 7 below summarizes the outputs from the real-time torque and drag solution.

TABLE 7

| # | Outputs | Symbol | Units | RT/NRT |
|---|---|---|---|---|
| 1. | Actual Inclination | Inc. Aver | Rad | RT |
| 2. | Slack off Hookload ($\mu = 0.1$) | N/A | Kips | RT |
| 3. | Slack off Hookload ($\mu = 0.2$) | N/A | Kips | RT |
| 4. | Slack off Hookload ($\mu = 0.3$) | N/A | Kips | RT |
| 5. | Pick up Hookload ($\mu = 0.1$) | N/A | Kips | RT |
| 6. | Pick up Hookload ($\mu = 0.2$) | N/A | Kips | RT |
| 7. | Pick up Hookload ($\mu = 0.3$) | N/A | Kips | RT |
| 8. | Torque OHFF ($\mu = 0.1$) | N/A | Ft-lbf | RT |
| 9. | Torque OHFF ($\mu = 0.2$) | N/A | Ft-lbf | RT |
| 10. | Torque OHFF ($\mu = 0.3$) | N/A | Ft-lbf | RT |
| 14. | Torque OHFF ($\mu = 0.4$) | N/A | Ft-lbf | RT |

Real-Time Torque and Drag Solution

The torque and drag solution is a real-time optimization solution to predict and evaluate the performance of a particular drilling situation. The system allows customers to view 'broomstick,' style graphs which are created in real-time. These graphs are created for hookload, friction force, friction factor, and torque. The broomstick displays compare the planned effects with the actual effects computed in real-time from the measurements made at the drill site. The system performs the hookload, friction factor, and torque and drag analyses with six subsystems.

Figure 20:
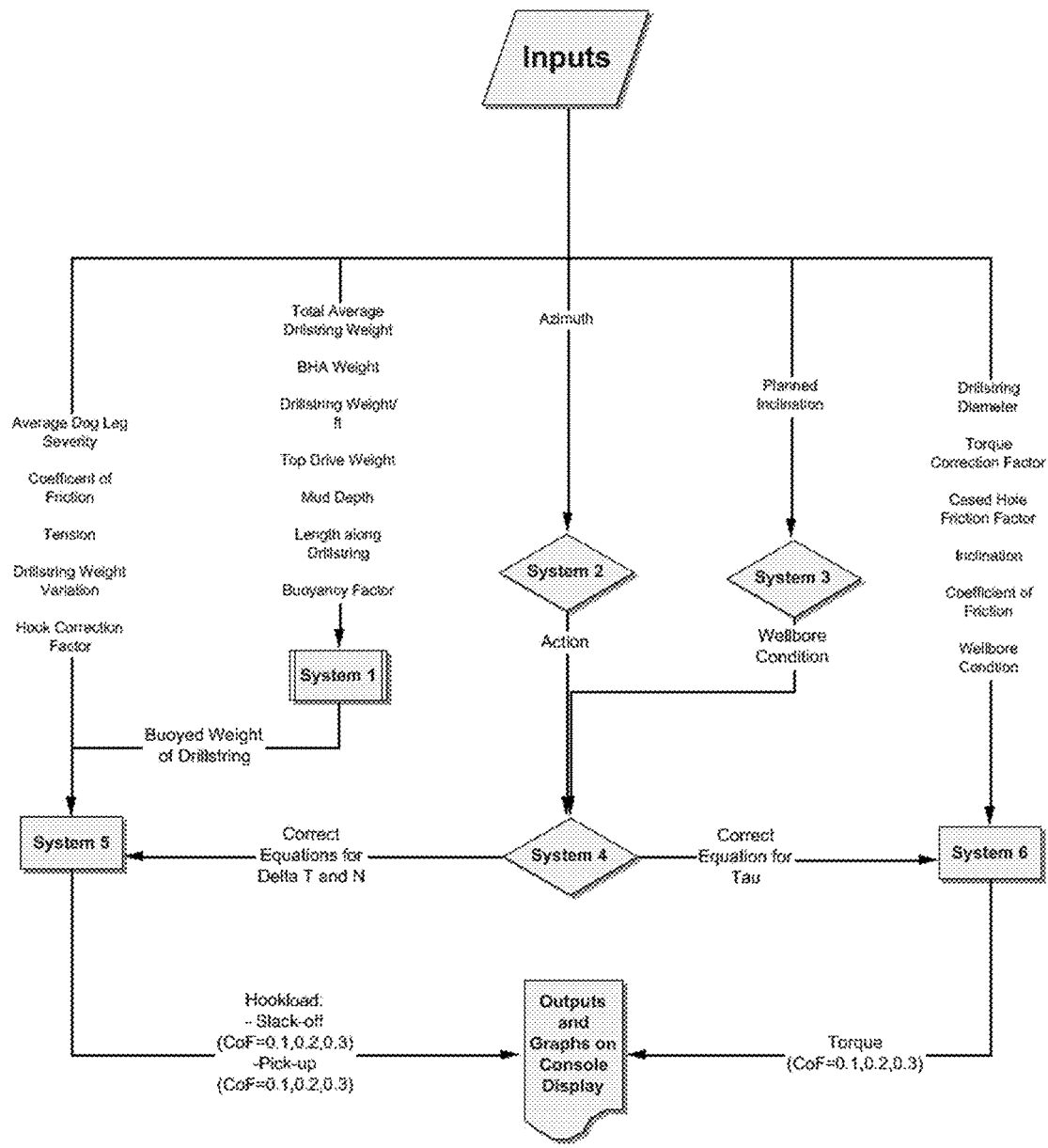
FIG. 20 illustrates movement of variables through a system and the interdependency of subsystems.

FIG. 20 illustrates the movement of variables through the system and the interdependency of the subsystems.

System 1. Drill String Load Analysis Per Section

Figure 21:
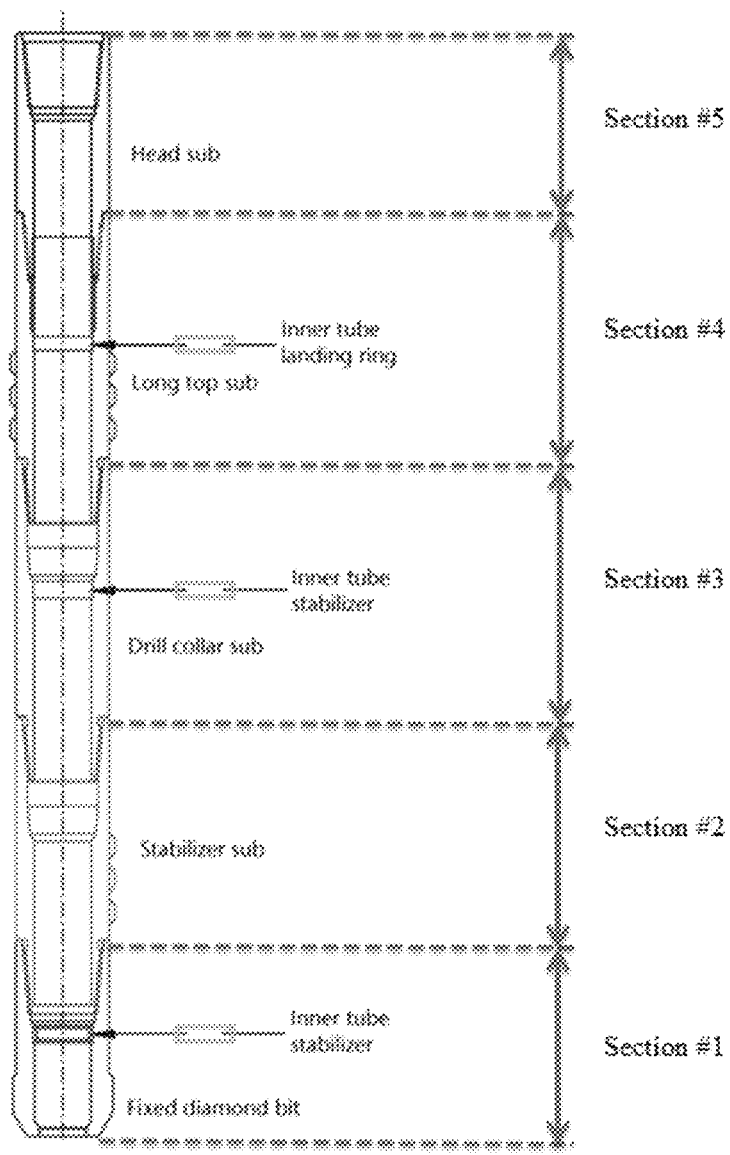
FIG. 21 illustrates a diagram to explain the numbering of bottom hole assembly (BHA) sections.

For analysis, the drill string is split into four sections, each with a different weight per foot value. Section 1 is the BHA and the section number increases with distance from the bit. System 1 computes the weight of the drill string for each section by multiplying the weight per foot for that section of drill string by the length in feet of that section. See FIG. 21 illustrating a diagram to explain the numbering of BHA sections.

System 2. Action Selector

Figure 22:
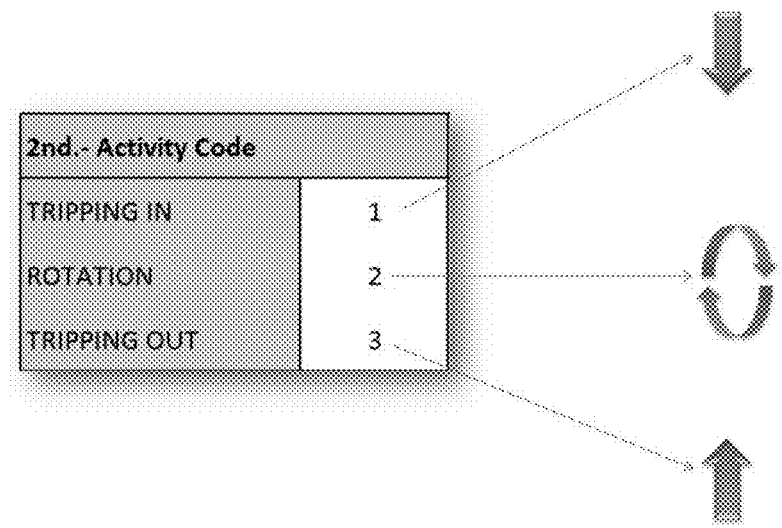
FIG. 22 illustrates a diagram to show the number assigned to each activity.

The action selector system has an input which is the action that the drill string is performing at an instant. The drilling activities that can occur are tripping in, rotating and tripping out. An explanation of the drilling activities can be seen in FIG. 22 illustrating a diagram to show the number assigned to each activity. System 2 transforms the action into an input to System 4, discussed below, which allows for the correct equation to be used to calculate the forces of friction and tension for each section.

System 3. Wellbore Condition Selector

Figure 23:
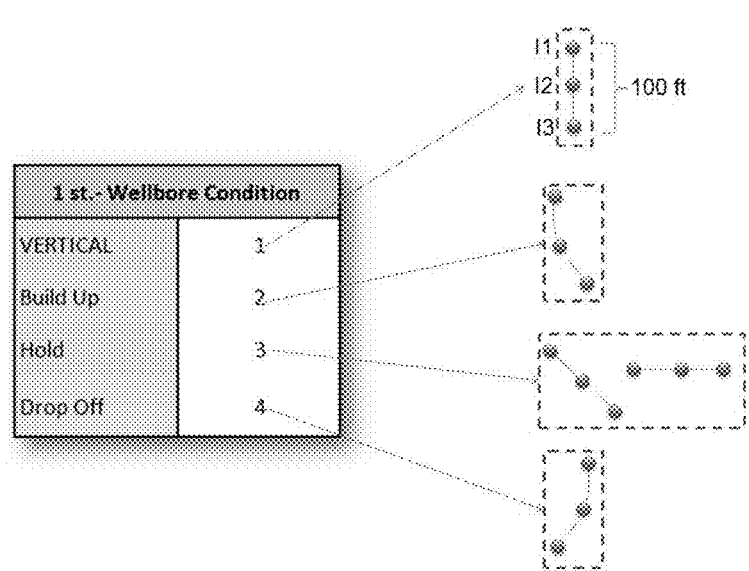
FIG. 23 illustrates a diagram to show the numbers assigned to each wellbore condition.

The wellbore condition selector system has an input which is the condition that the wellbore is in at an instant. The wellbore conditions that can occur are vertical, build-up, hold, and drop-off. An explanation of the wellbore conditions can be seen in FIG. 23 illustrating a diagram to show the numbers assigned to each wellbore condition. System 3 transforms the action into an input to System 4, discussed below, which allows for the correct equation to be used to calculate the forces of friction and tension for each section.

System 4. Equation Locator

The equation locator system uses the outputs from System 2 and System 3 to choose the correct equations to use to calculate the hookload for each specific condition. Table 8, shown below, shows the equations used by System 4 for different actions and conditions.

TABLE 8

| Action Selector System 2 | Wellbore Condition Selector System 3 | Equation Code System 4 | Equation for Change in Tension $\Delta T$ (lbf) System 5 | Equation for Normal Reaction Force N (lbf) System 5 |
|---|---|---|---|---|
| Tripping In (RIH) | Drop-Off | A1 | $\Delta T = W\cos(I) - \mu[W\sin(I) + 2T\sin(\delta/2)]$ | $N = W\sin(I) + 2T\sin(\delta/2)$ |
| | Build-Up | A2 | $\Delta T = W\cos(I) - \mu|W\sin(I) - 2T\sin(\delta/2)|$ | $N = W\sin(I) - 2T\sin(\delta/2)$ |
| | Hold | A3 | $\Delta T = W\cos(I) + \mu W\sin(I)$ | $N = W\sin(I)$ |
| Rotating | Drop-Off | B1 | $\Delta T = W\cos(I)$ | $N = W\sin(I) + 2T\sin(\delta/2)$ |
| | Build-Up | B2 | $\Delta T = W\cos(I)$ | $N = W\sin(I) - 2T\sin(\delta/2)$ |
| | Hold | B3 | $\Delta T = W\cos(I) + \mu W\sin(I)$ | $N = W\sin(I)$ |
| Tripping Out (POH) | Drop-Off | C1 | $\Delta T = W\cos(I) + \mu[W\sin(I) + 2T\sin(\delta/2)]$ | $N = W\sin(I) + 2T\sin(\delta/2)$ |
| | Build-Up | C2 | $\Delta T = W\cos(I) + \mu|W\sin(I) - 2T\sin(\delta/2)|$ | $N = W\sin(I) - 2T\sin(\delta/2)$ |
| | Hold | C3 | $\Delta T = W\cos(I) + \mu W\sin(I)$ | $N = W\sin(I)$ |

System 5. Hookload Analysis

System 5 uses the correct equation for each set of data as specified by system 4 to perform the hookload analysis. System 5 also uses both real-time and non-real-time data for inputs.

System 6. Torque Analysis

System 6 uses the correct equation for each set of data as specified by System 4 to perform the torque analysis. System 6 also uses both real-time and non-real-time data for inputs.

Correction Factors

Correction factors are used to calibrate measured field data in order to improve the accuracy of the data used in calculations. In the calculation engine a correction factor is used for the hookload.

The correction factor used for the hookload is a percentage value. The pick-up hookload is found in the calculation engine by multiplying the tripping out hookload force by 100% plus the percentage hookload correction factor.

Table 9 below shows the magnitude of the correction factors used and whether the original value is increased by a percentage correction factor or whether the original value is increased by addition of the correction factor.

TABLE 9

| Output to be Corrected: | Type of Correction | Value |
|---|---|---|
| Hook | Percentage | 18% |
| Torque | Addition | 3500 |
| Case Hole | Percentage | 10% |

In practice, correction factors change whenever the drilling conditions change, for example, when a section of the drill string is changed.

Console Displays

Figure 24:
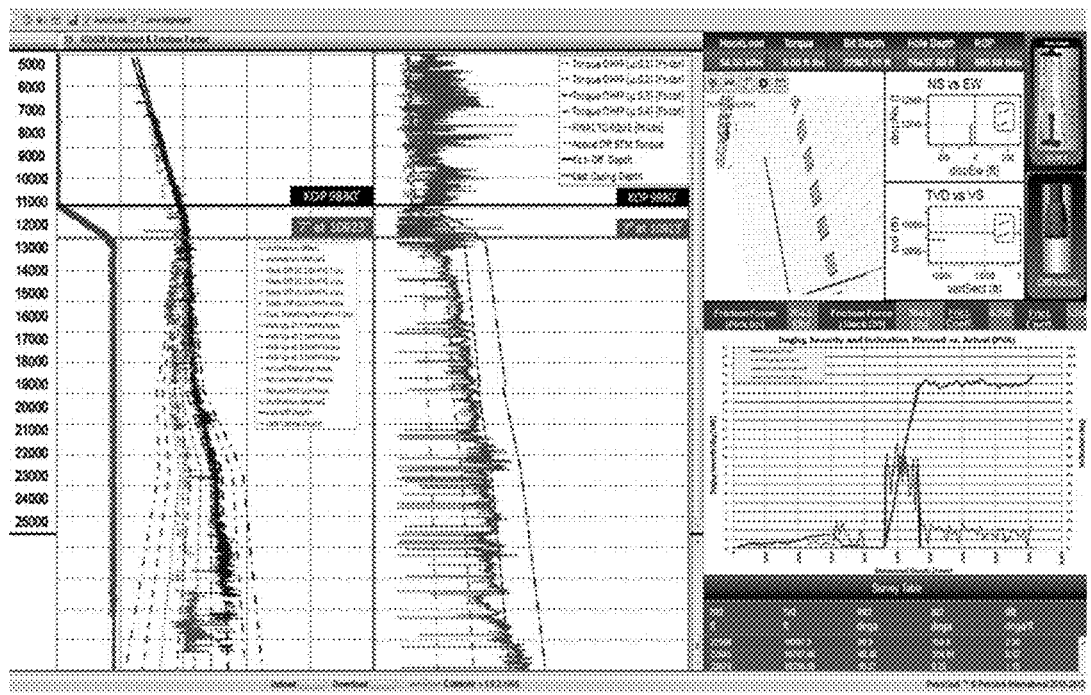
FIG. 24 shows an example of a real-time display console that can provide for Torque and Drag analysis.
Figure 25:
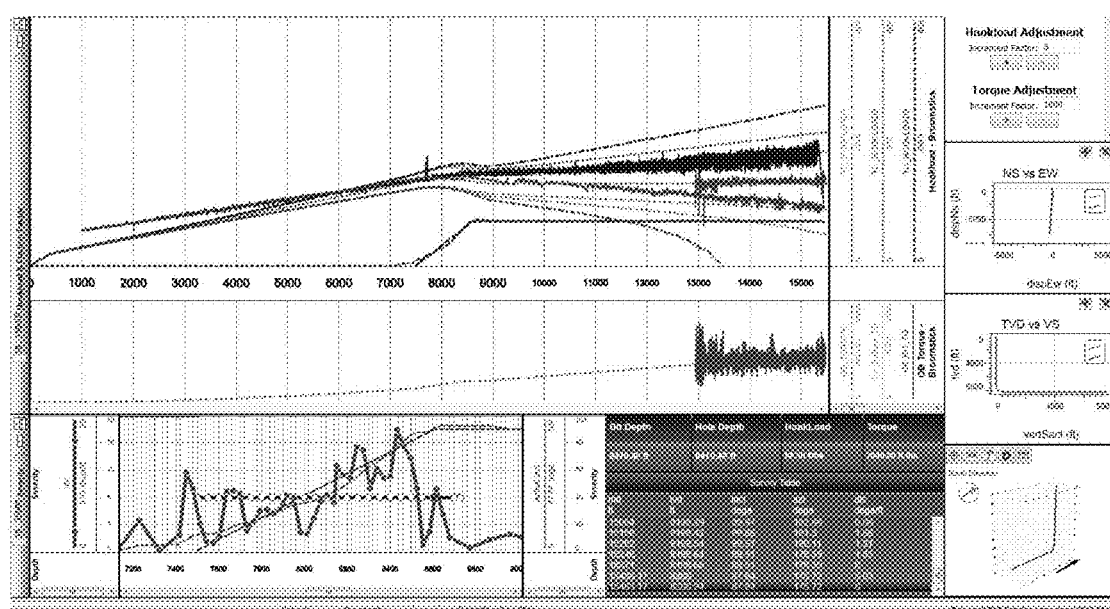
FIG. 25 shows an alternative display with the broomstick graphs displayed horizontally.

FIG. 24 shows an example of the real-time display console that can provide for torque and drag analysis. This particular display has the hookload broomstick as the first graph from the left and the torque broomstick as the second display from the left. It also has displays for trajectory and dogleg severity. FIG. 25 shows an alternative display with the broomstick graphs displayed horizontally.

Figure 26:
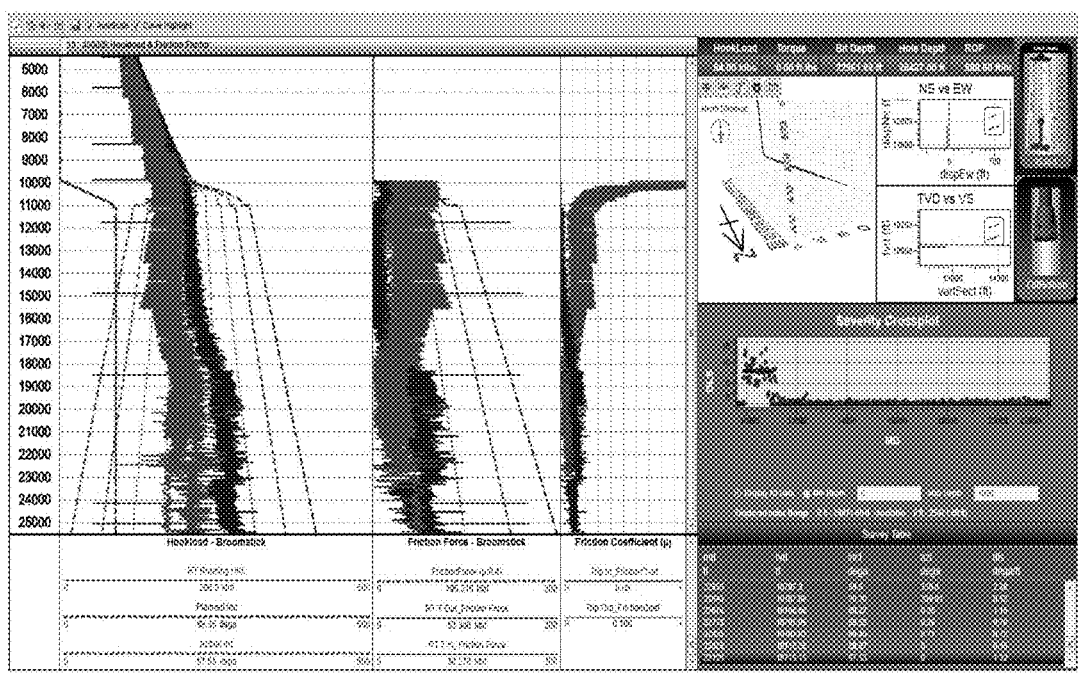
FIG. 26 illustrates an example of the hookload and friction factor display.

FIG. 26 illustrates an example of the hookload and friction factor display. FIG. 26 shows that the largest section of the console display is made up of three graphs that compare the actual values to the planned values for hookload, friction force, and friction coefficient. The display includes three smaller plots for the wellbore trajectory: (1) showing the wellbore trajectory as a whole in three dimensions; (2) 'NS vs. EW,' showing the angle of the drill string; and (3) 'TVD vs. VS,' showing the relationship between the true vertical depth and the vertical section. Each of these has curves for both planned and actual value. There is also a small diagram to display the block height and one to indicate whether the drill string is on bottom or off bottom. Finally, there is a display to show how the dogleg severity of the drill string varies with the measured depth.

Figure 27:
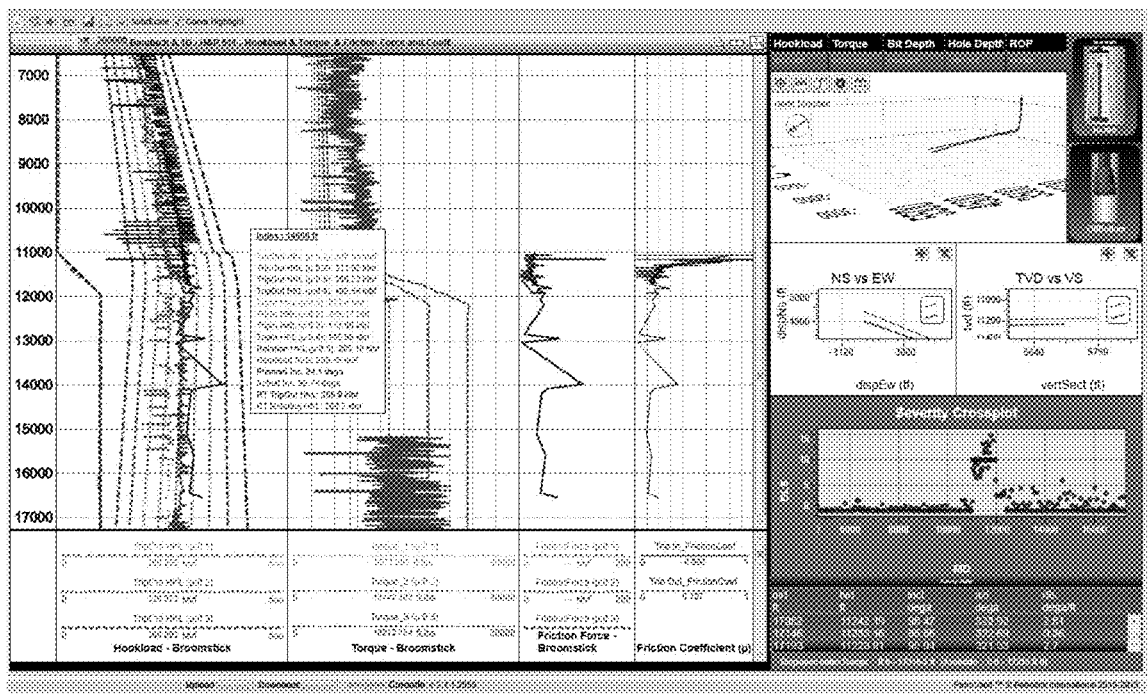
FIG. 27 shows a display that combines that graphs from the Torque & Drag Display and the graphs from the Hookload and Friction Factor Display.
Figure 28:
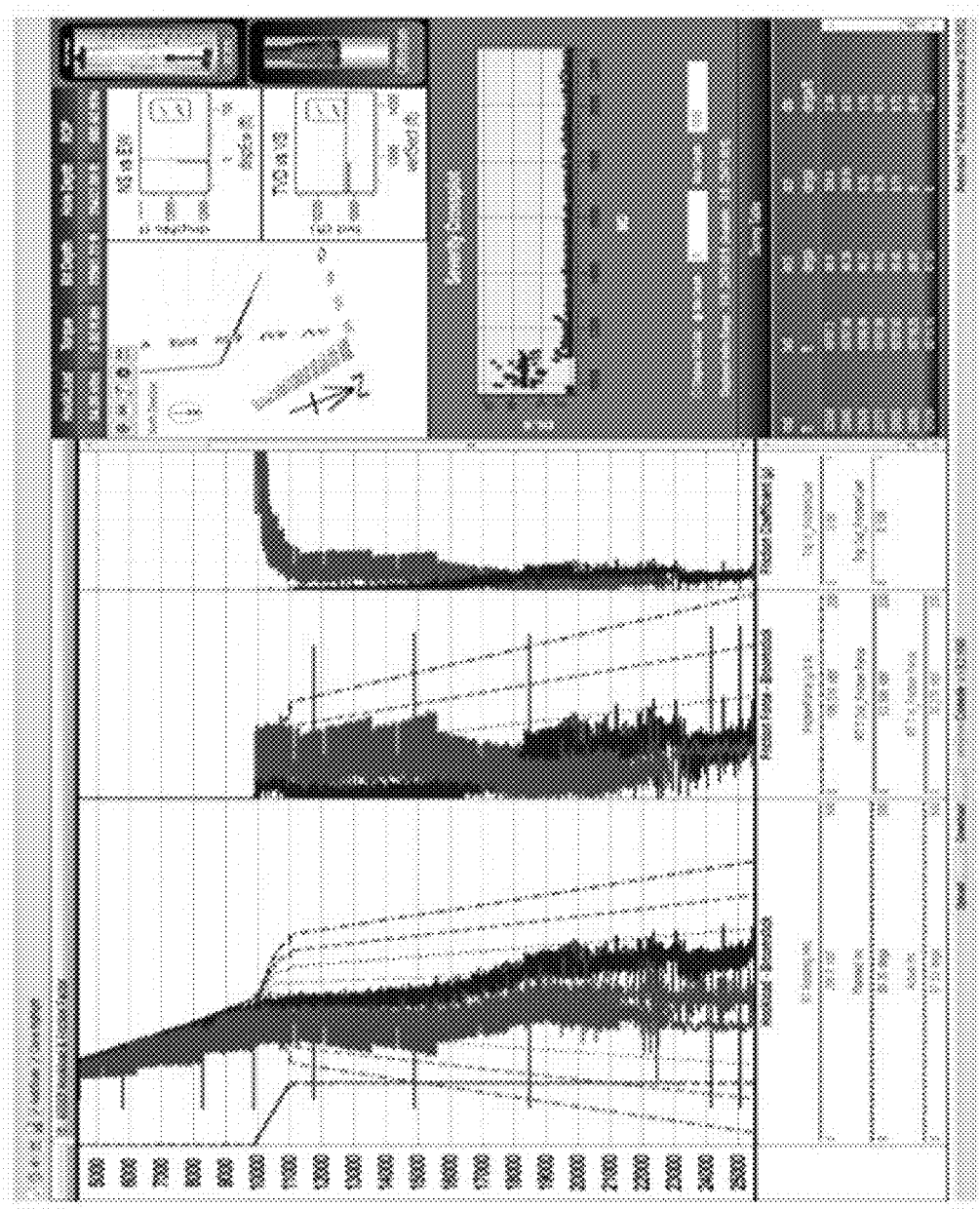
FIG. 28 illustrates a display according to an embodiment of the present disclosure.
Figure 29:
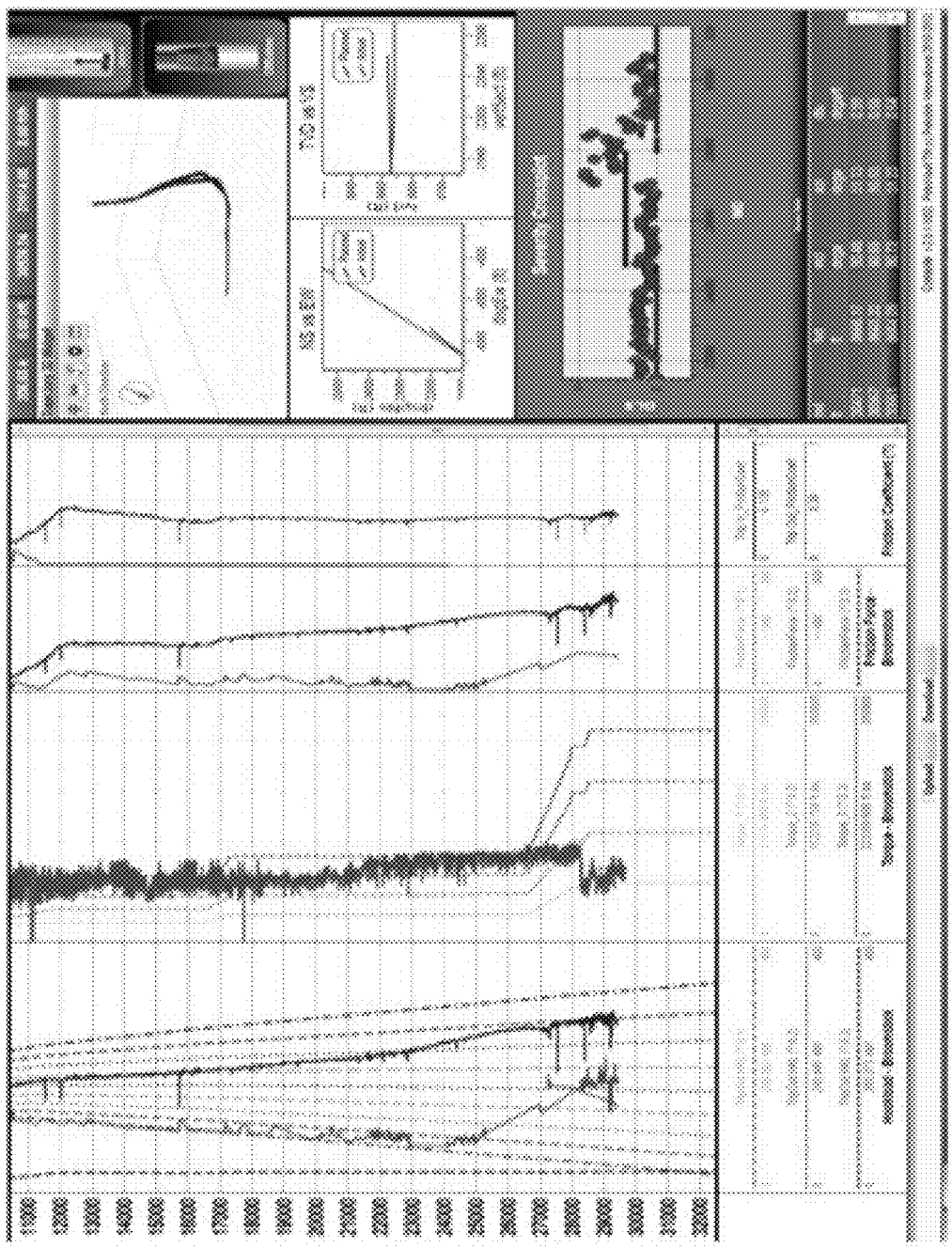
FIG. 29 illustrates a display according to an embodiment of the present disclosure.
Figure 30:
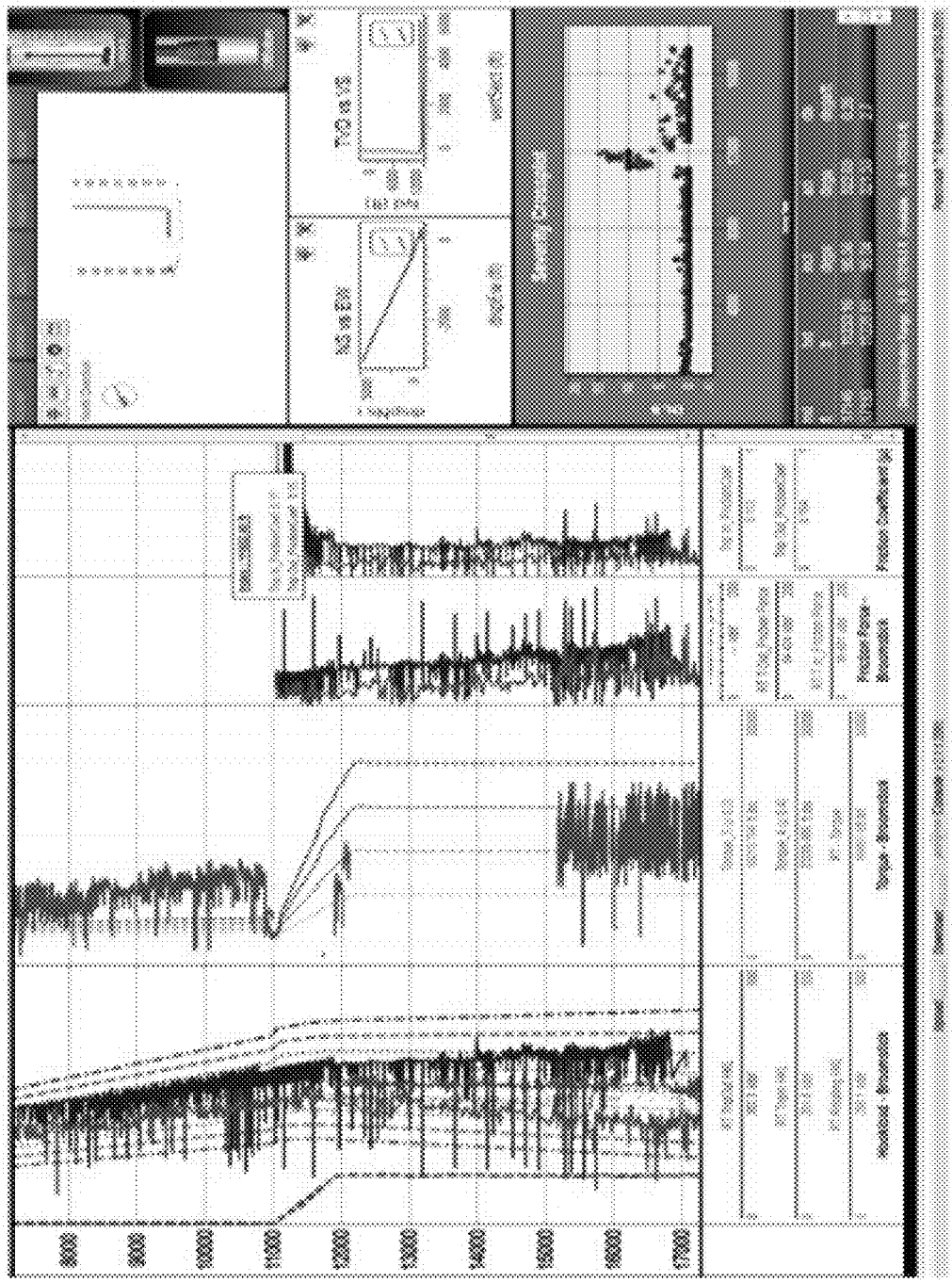
FIG. 30 illustrates a display according to an embodiment of the present disclosure.
Figure 31:
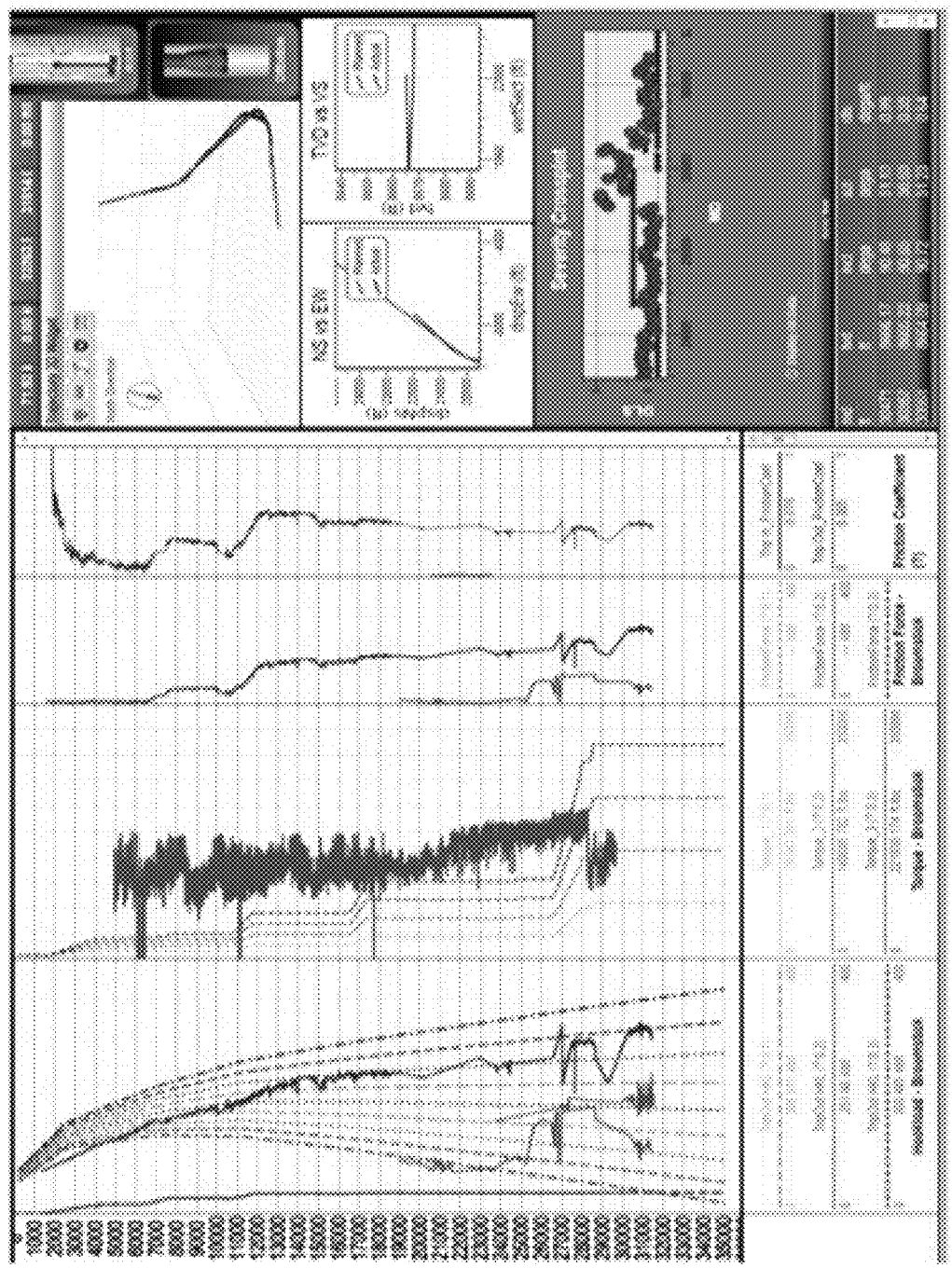
FIG. 31 illustrates a display according to an embodiment of the present disclosure.

FIG. 27 shows a display that combines that graphs from the torque and drag display and the graphs from the hookload and friction factor display. FIGS. 28-31 illustrate additional displays according to the present disclosure.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

The invention claimed is:

1. A method comprising, by a computer system:
receiving, in real-time, a mud weight produced by one or more sensors in relation to a well;
receiving non-real-time data in relation to the well;
identifying at least one of a laminar flow, a transitional flow, or a turbulent flow of a fluid in the well based, at least in part, on the mud weight;
responsive to the identifying, determining a plurality of fanning friction factors inside an annulus of the well;
determining a plurality of pressure loss gradients using the plurality of fanning friction factors;
determining a pressure loss between a drill pipe and casing of the well based, at least in part, on a first pressure loss gradient of the plurality of pressure loss gradients;
determining a pressure loss between the drill pipe and an open portion of the well based, at least in part, on a second pressure loss gradient of the plurality of pressure loss gradients;
determining an equivalent mud weight associated with each of a plurality of measured depths in the well based, at least in part, on the mud weight, the non-real-time data, the pressure loss between the drill pipe and the casing of the well, and the pressure loss between the drill pipe and the open portion of the well; and
for each of the plurality of measured depths, facilitating a real-time display of an equivalent mud weight, wherein the real-time display of the equivalent mud weight comprises information relating to the equivalent circulating density corresponding to real-time measured depths in the well.

2. The method of claim 1, comprising determining an average maximum speed of pipe movement based, at least in part, on the non-real-time data.

3. The method of claim 2, comprising determining an equivalent fluid velocity based, at least in part, on the average maximum speed of pipe movement.

4. The method of claim 3, comprising determining an effective viscosity based, at least in part, on the equivalent fluid velocity.

5. The method of claim 4, comprising determining a Reynolds number based, at least in part, on the mud weight, the equivalent fluid velocity, and the effective viscosity.

6. The method of claim 5, wherein the plurality of fanning friction factors is based, at least in part, on the Reynolds number.

7. The method of claim 1, comprising:
determining a gel-breaking pressure for an annular section length; and
wherein the equivalent mud weight is based, at least in part, on a higher of the gel-breaking pressure and the pressure loss.

8. The method of claim 1, wherein the determined equivalent mud weight comprises an equivalent mud weight for swab.

9. The method of claim 1, wherein the determined equivalent mud weight comprises an equivalent mud weight for surge.

10. A system comprising a processor and memory, wherein the processor and memory in combination are operable to implement a method comprising:
receiving, in real-time, a mud weight produced by one or more sensors in relation to a well;

receiving non-real-time data in relation to the well;

identifying at least one of a laminar flow, a transitional flow, or a turbulent flow of a fluid in the well based, at least in part, on the mud weight;

responsive to the identifying, determining a plurality of fanning friction factors inside an annulus of the well;

determining a plurality of pressure loss gradients using the plurality of fanning friction factors;

determining a pressure loss between a drill pipe and casing of the well based, at least in part, on a first pressure loss gradient of the plurality of pressure loss gradients;

determining a pressure loss between the drill pipe and an open portion of the well based, at least in part, on a second pressure loss gradient of the plurality of pressure loss gradients;

determining an equivalent mud weight associated with each of a plurality of measured depths in the well based, at least in part, on the mud weight, the non-real-time data, the pressure loss between the drill pipe and the casing of the well, and the pressure loss between the drill pipe and the open portion of the well; and for each of the plurality of measured depths, facilitating a real-time display of an equivalent mud weight, wherein the real-time display of the equivalent mud weight comprises information relating to the equivalent circulating density corresponding to real-time measured depths in the well.

11. The system of claim 10, the method comprising determining an average maximum speed of pipe movement based, at least in part, on the non-real-time data.

12. The system of claim 11, the method comprising determining an equivalent fluid velocity based, at least in part, on the average maximum speed of pipe movement.

13. The system of claim 12, the method comprising determining an effective viscosity based, at least in part, on the equivalent fluid velocity.

14. The system of claim 13, the method comprising determining a Reynolds number based, at least in part, on the mud weight, the equivalent fluid velocity, and the effective viscosity.

15. The system of claim 10, the method comprising:
determining a gel-breaking pressure for an annular section length; and
wherein the equivalent mud weight is based, at least in part, on a higher of the gel-breaking pressure and the pressure loss.

16. The system of claim 10, wherein the determined equivalent mud weight comprises an equivalent mud weight for at least one of swab or surge.

17. A computer-program product comprising a non-transitory computer-usable medium having a computer-readable program code embodied therein, the computer-readable program code adapted to be executed to implement a method comprising:

receiving, in real-time, a mud weight produced by one or more sensors in relation to a well;

receiving non-real-time data in relation to the well;

identifying at least one of a laminar flow, a transitional flow, or a turbulent flow of a fluid in the well based, at least in part, on the mud weight;

responsive to the identifying, determining a plurality of fanning friction factors inside an annulus of the well;

determining a plurality of pressure loss gradients using the plurality of fanning friction factors;

determining a pressure loss between a drill pipe and casing of the well based, at least in part, on a first pressure loss gradient of the plurality of pressure loss gradients;

determining a pressure loss between the drill pipe and an open portion of the well based, at least in part, on a second pressure loss gradient of the plurality of pressure loss gradients;

determining an equivalent mud weight associated with each of a plurality of measured depths in the well based, at least in part, on the mud weight, the non-real-time data, the pressure loss between the drill pipe and the casing of the well, and the pressure loss between the drill pipe and the open portion of the well; and for each of the plurality of measured depths, facilitating a real-time display of an equivalent mud weight, wherein the real-time display of the equivalent mud weight comprises information relating to the equivalent circulating density corresponding to real-time measured depths in the well.

* * * * *